US012785955B2

(12) United States Patent
Curet et al.

(10) Patent No.: US 12,785,955 B2
(45) Date of Patent: Nov. 3, 2026

(54) HARDWARE SECURITY MODULE ADAPTER SYSTEM, METHOD AND DEVICE

(71) Applicant: Marvell Asia Pte Ltd, Singapore (SG)

(72) Inventors: Jon Cameron Grant Curet, Costa Mesa, CA (US); Daniel Wong, San Gabriel, CA (US)

(73) Assignee: MARVELL ASIA PTE, LTD, Singapore (SG)

( * ) Notice: Subject to any disclaimer, the term of this patent is extended or adjusted under 35 U.S.C. 154(b) by 27 days.

(21) Appl. No.: 19/189,130

(22) Filed: Apr. 24, 2025

(65) Prior Publication Data

US 2025/0266993 A1 Aug. 21, 2025

Related U.S. Application Data

(62) Division of application No. 18/102,218, filed on Jan. 27, 2023, now Pat. No. 12,309,267.

(60) Provisional application No. 63/396,642, filed on Aug. 10, 2022.

(51) Int. Cl.
*H04L 9/08* (2006.01)

(52) U.S. Cl.
CPC .................................. *H04L 9/0877* (2013.01)

(58) Field of Classification Search
CPC ................................ H04L 9/0877; H04L 9/08
See application file for complete search history.

(56) References Cited

U.S. PATENT DOCUMENTS

| | | | |
|---|---|---|---|
| 9,565,021 | B1 | 2/2017 | Czaplewski |
| 11,381,313 | B2 | 7/2022 | Liang |
| 12,309,267 | B1 | 5/2025 | Curet et al. |
| 12,393,520 | B1 | 8/2025 | Bareket et al. |
| 12,393,737 | B1 | 8/2025 | Curet et al. |
| 2007/0201490 | A1 | 8/2007 | Mahamuni |
| 2008/0251906 | A1 | 10/2008 | Eaton |
| 2017/0277913 | A1 | 9/2017 | Berge |
| 2018/0004980 | A1 | 1/2018 | Kuczynski |
| 2018/0026940 | A1 | 1/2018 | Sastri |
| 2020/0310981 | A1 | 10/2020 | Byun |
| 2020/0310982 | A1 | 10/2020 | Byun |
| 2021/0136576 | A1 | 5/2021 | Kinney |
| 2021/0175973 | A1 | 6/2021 | Liang |
| 2021/0384989 | A1 | 12/2021 | Nagarajan |
| 2022/0418110 | A1 | 12/2022 | Zhang |
| 2023/0134349 | A1 | 5/2023 | Masterson |
| 2024/0089116 | A1 | 3/2024 | Credico, Jr. |

*Primary Examiner* — Quazi Farooqui

(57) ABSTRACT

A hardware security module system, method and device including one or more security meshes that cover portions of a circuit board including the encryption/decryption component for determining if an unwanted physical access of the circuit board is occurring and disabling or erasing the hardware security module to prevent the unauthorized access of encryption data.

38 Claims, 14 Drawing Sheets

HARDWARE SECURITY MODULE ADAPTER SYSTEM, METHOD AND DEVICE

RELATED APPLICATIONS

This application is a continuation of the co-pending U.S. patent application Ser. No. 18/102,218, filed Jan. 27, 2023 and entitled "HARDWARE SECURITY MODULE ADAPTER SYSTEM, METHOD AND DEVICE," which claims priority under 35 U.S.C. § 119(e) of the U.S. provisional patent application Ser. No. 63/396,642, filed Aug. 10, 2022, and titled "PCI SECURITY HSM ADAPTER," which are both hereby incorporated by reference in their entirety.

FIELD OF INVENTION

The present invention relates to circuits including encryption/decryption components such as hardware security modules (HSM). More particularly, the present invention relates to adapters for enhancing security of circuits including encryption/decryption components.

BACKGROUND OF THE INVENTION

The security of data stored in electronic circuitry has become an important issue. Highly sensitive information such as encryption/decryption software keys (e.g. stored in encryption components), financial data, PIN numbers, passwords, and access codes are frequently the target of unauthorized access. One method used in attempting to access this data is the physical penetration of the printed circuit board assembly containing electronic components such as processors, logic circuits, or other circuits or components, as well as various memory devices used to store programs or data. Exposed address and data lines within the printed circuit board assembly may allow access to sensitive data. The penetration of the physical package may be brought about through chemicals, drilling, separation, etc. In addition, X-rays and other known techniques may allow non-destructive penetration into the physical package.

BRIEF SUMMARY OF THE INVENTION

A hardware security module system, method and device including one or more security meshes that cover portions of a circuit board including the encryption/decryption component for determining if an unwanted physical access of the circuit board is occurring and disabling or erasing the hardware security module to prevent the unauthorized access of encryption data (e.g. encryption keys stored on the encryption/decryption component). Specifically, each trace forming the web of the meshes is able to be electrically coupled with a plurality of mesh contact pads and a plurality of circuit board contact pads such that in order to disable one trace of the mesh an intruder would need to short circuit/bypass each of the plurality of mesh contact pads electrically coupled to that trace in series. Further, the system, method and device is able to include a heat dissipating plate coupled to the circuit board under the security mesh that spreads out heat generated by the circuit board (e.g. the CPU, encryption/decryption component, a mesh controller and/or other components well known in the art) such that the heat is not centralized in any one location as it is transferred from the circuit board to the mesh covering the circuit board. As a result, the heat dissipating plate helps the components of the circuit board not overheat or cause damage to the mesh. Indeed, the mesh hinders heat transfer, but by spreading out the heat generated by the components with the dissipating plate, the system provides the advantage of being able to continuously get enough heat to dissipate through the mesh and off the board to prevent overheating. Moreover, the system, method and device is able to include one or more rigid mesh covers that cover and protect the outside of the meshes from damage and are able to include channels having compressing bodies therein that elastically provide a firm compression between each of the contact pads of the meshes and each of the contact pads of the circuit board when the cover is secured to the circuit board.

A first aspect is directed to a hardware security module system. The system comprises a printed circuit board including a top side, a bottom side opposite the top side, an encryption/decryption component for encrypting/decrypting data, a mesh controller, a central processing unit (CPU) electrically coupled with the encryption/decryption component and the mesh controller and a plurality of board contact pads, a first flexible mesh circuit including a web of a plurality of first metal traces electrically coupled with a plurality of first mesh contact pads, wherein the first flexible mesh is electrically coupled with the mesh controller via a first set of the board contact pads located on the top side of the printed circuit board and a second flexible mesh circuit including a web of a plurality of second metal traces electrically coupled with a plurality of second mesh contact pads, wherein the second flexible mesh is electrically coupled with the mesh controller via a second set of the board contact pads located on the bottom side of the printed circuit board.

In some embodiments, the first flexible mesh circuit covers a location of the encryption/decryption component on the top side of the printed circuit board and the second flexible mesh circuit covers a location of the encryption/decryption component on the bottom side of the printed circuit board. In some embodiments, the mesh controller transmits electrical signals through and receives return electric signals from the first and second metal traces of the first and second flexible mesh circuits via the board contact pads and the first and second mesh contact pads. In some embodiments, each of the electrical signals transmitted from the mesh controller travel through both the first flexible mesh circuit and the second flexible mesh circuit before returning to the mesh controller. In some embodiments, the mesh controller deletes encryption keys maintained by the encryption/decryption component when signals received from one or both of the first and second flexible mesh circuits deviate from expected values. In some embodiments, first mesh contact pads are distributed along a perimeter of the first flexible mesh circuit and the board contact pads of the first set of the board contact pads are positioned around the encryption/decryption component on the top side of the printed circuit board such that each of the first set of board contact pads aligns with one of the first mesh contact pads.

In some embodiments, the system further comprises a rigid heat sink cover having a first side including a plurality of heat dissipating fins and a second side having a central recess for receiving the first flexible mesh circuit, wherein the second side couples to the first flexible mesh and the top side of the printed circuit board such that the first flexible mesh is sandwiched in between the second side of the rigid heat sink cover and the top side of the printed circuit board. In some embodiments, the system further comprises a rigid bottom cover having a first face including a central cavity for receiving the second flexible mesh circuit, wherein the first face couples to the second flexible mesh and the bottom side of the printed circuit board such that the second flexible mesh is sandwiched in between the first face of the rigid bottom cover and the bottom side of the printed circuit board. In some embodiments, the second side of the rigid heat sink cover has a plurality of channels positioned along a perimeter of the rigid heat sink, the system further comprising a plurality of compressing bodies each having a base and one or more elastic bumps protruding from the base, wherein each of the bases is positioned within one of the plurality of channels such that the elastic bumps of that base protrude out of the one of the plurality of channels.

In some embodiments, when the first flexible mesh is sandwiched in between the second side of the rigid heat sink cover and the top side of the printed circuit board, each of the bumps is compressed against a different one of the first mesh contact pads thereby pushing the different one of the first mesh contact pads against one of the first set of board contact pads with which the different one of the first mesh contact pads is aligned. In some embodiments, the system further comprises a rigid metal heat dissipator plate coupled to the top side of the printed circuit board between the central processing unit, the encryption/decryption component and the mesh controller and the first flexible mesh in order to distribute heat produced by the central processing unit, the encryption/decryption component and the mesh controller throughout the plate. In some embodiments, a perimeter of the rigid metal heat dissipator plate is adjacent to a perimeter of the first flexible mesh where the first flexible mesh couples to the printed circuit board. In some embodiments, the printed circuit board further comprises a microcontroller unit (MCU) and both the mesh controller and the encryption/decryption component are a part of the MCU.

A second aspect is directed to a method of implementing a hardware security module system. The method comprises providing a printed circuit board including a top side, a bottom side opposite the top side, an encryption/decryption component for encrypting/decrypting data, a mesh controller, a central processing unit (CPU) electrically coupled with the encryption/decryption component and the mesh controller and a plurality of board contact pads, electrically coupling a first flexible mesh circuit with the mesh controller via a first set of the board contact pads located on the top side of the printed circuit board, the first flexible mesh circuit including a web of a plurality of first metal traces electrically coupled with a plurality of first mesh contact pads and electrically coupling a second flexible mesh with the mesh controller via a second set of the board contact pads located on the bottom side of the printed circuit board, the second flexible mesh circuit including a web of a plurality of second metal traces electrically coupled with a plurality of second mesh contact pads.

In some embodiments, the first flexible mesh circuit covers a location of the encryption/decryption component on the top side of the printed circuit board and the second flexible mesh circuit covers a location of the encryption/decryption component on the bottom side of the printed circuit board. In some embodiments, the method further comprises, with the mesh controller, transmitting electrical signals through and receiving return electric signals from the first and second metal traces of the first and second flexible mesh circuits via the board contact pads and the first and second mesh contact pads. In some embodiments, each of the electrical signals transmitted from the mesh controller travel through both the first flexible mesh circuit and the second flexible mesh circuit before returning to the mesh controller. In some embodiments, the method further comprises deleting encryption keys maintained by the encryption/decryption component with the mesh controller when signals received from one or both of the first and second flexible mesh circuits deviate from expected values. In some embodiments, first mesh contact pads are distributed along a perimeter of the first flexible mesh circuit and the board contact pads of the first set of the board contact pads are positioned around the encryption/decryption component on the top side of the printed circuit board such that each of the first set of board contact pads aligns with one of the first mesh contact pads.

In some embodiments, the method further comprises coupling a second side of a rigid heat sink cover to the first flexible mesh and the top side of the printed circuit board such that the first flexible mesh is sandwiched in between the second side of the rigid heat sink cover and the top side of the printed circuit board, the rigid heat sink cover having a first side including a plurality of heat dissipating fins and the second side having a central recess for receiving the first flexible mesh circuit. In some embodiments, the method further comprises coupling a first face of a rigid bottom cover to the second flexible mesh and the bottom side of the printed circuit board such that the second flexible mesh is sandwiched in between the first face of the rigid bottom cover and the bottom side of the printed circuit board, the rigid bottom cover having the first face including a central cavity for receiving the second flexible mesh circuit. In some embodiments, the second side of the rigid heat sink cover has a plurality of channels positioned along a perimeter of the rigid heat sink, further comprising positioning a plurality of compressing bodies, each having a base and one or more elastic bumps protruding from the base, within one of the plurality of channels such that the elastic bumps of that base protrude out of the one of the plurality of channels.

In some embodiments, when the first flexible mesh is sandwiched in between the second side of the rigid heat sink cover and the top side of the printed circuit board, each of the bumps is compressed against a different one of the first mesh contact pads thereby pushing the different one of the first mesh contact pads against one of the first set of board contact pads with which the different one of the first mesh contact pads is aligned. In some embodiments, the method further comprises coupling a rigid metal heat dissipator plate to the top side of the printed circuit board between the central processing unit, the encryption/decryption component and the mesh controller and the first flexible mesh in order to distribute heat produced by the central processing unit, the encryption/decryption component and the mesh controller throughout the plate. In some embodiments, a perimeter of the rigid metal heat dissipator plate is adjacent to a perimeter of the first flexible mesh where the first flexible mesh couples to the printed circuit board. In some embodiments, the printed circuit board further comprises a microcontroller unit (MCU) and both the mesh controller and the encryption/decryption component are a part of the MCU.

A third aspect is directed to a hardware security module adapter. The adapter comprises a substrate including a top side, a bottom side opposite the top side, an encryption/decryption component for encrypting/decrypting data, a mesh controller, a central processing unit (CPU) electrically coupled with the encryption/decryption component and the mesh controller and a plurality of substrate contact pads, a flexible mesh circuit including a web of a plurality of first metal traces electrically coupled with a plurality of first mesh contact pads, wherein the flexible mesh is electrically coupled with the mesh controller via a first set of the substrate contact pads located on the top side of the substrate and a rigid heat sink cover having a first side including a plurality of heat dissipating fins and a second side having a central recess for receiving the flexible mesh circuit, wherein the second side couples to the flexible mesh and the top side of the substrate such that the flexible mesh is sandwiched in between the second side of the rigid heat sink cover and the top side of the substrate.

In some embodiments, the flexible mesh circuit covers a location of the encryption/decryption component on the top side of the substrate. In some embodiments, the mesh controller transmits electrical signals through and receives return electric signals from the first metal traces of the flexible mesh circuit via the substrate contact pads and the first mesh contact pads. In some embodiments, each of the electrical signals transmitted from the mesh controller travel through the flexible mesh circuit, the substrate contact pads and traces within the substrate before returning to the mesh controller. In some embodiments, the mesh controller deletes data stored in the encryption/decryption component required to generate encryption keys when signals received from the flexible mesh circuit deviate from expected values. In some embodiments, first mesh contact pads are distributed along a perimeter of the flexible mesh circuit and the substrate contact pads of the first set of the substrate contact pads are positioned around the encryption/decryption component on the top side of the substrate such that each of the first set of substrate contact pads aligns with one of the first mesh contact pads.

In some embodiments, the second side of the rigid heat sink cover has a plurality of channels positioned along a perimeter of the rigid heat sink, further comprising a plurality of compressing bodies each having a base and one or more elastic bumps protruding from the base, wherein each of the bases is positioned within one of the plurality of channels such that the elastic bumps of that base protrude out of the one of the plurality of channels. In some embodiments, when the flexible mesh is sandwiched in between the second side of the rigid heat sink cover and the top side of the substrate, each of the bumps is compressed against a different one of the first mesh contact pads thereby pushing the different one of the first mesh contact pads against one of the first set of substrate contact pads with which the different one of the first mesh contact pads is aligned. In some embodiments, the adapter further comprises a rigid metal heat dissipator plate coupled to the top side of the substrate between the central processing unit, the encryption/decryption component and the mesh controller and the flexible mesh in order to distribute heat produced by the central processing unit, the encryption/decryption component and the mesh controller throughout the plate. In some embodiments, a perimeter of the rigid metal heat dissipator plate is adjacent to a perimeter of the flexible mesh where the flexible mesh couples to the substrate. In some embodiments, the substrate further comprises a microcontroller unit (MCU) and both the mesh controller and the encryption/decryption component are a part of the MCU.

A fourth aspect is directed to a security module system. The system comprises a printed circuit board including a top side, a bottom side opposite the top side, means for encrypting/decrypting data, means for controlling both first and second means for securing the means for encrypting/decrypting data, means for processing data and first means for electrically coupling the first and second means for securing with the means for controlling, wherein the means for processing is electrically coupled with the means for encrypting/decrypting data and the means for controlling, the first means for securing including first means for forming a first conductive web electrically coupled with second means for electrically coupling the first means for forming the first conductive web with a first portion of the first means for electrically coupling positioned on the top side of the printed circuit board and the second means for securing including second means for forming a second conductive web electrically coupled with third means for electrically coupling the second means for forming the second conductive web with a second portion of the first means for electrically coupling positioned on the bottom side of the printed circuit board.

DETAILED DESCRIPTION OF THE INVENTION

Figure 1A:
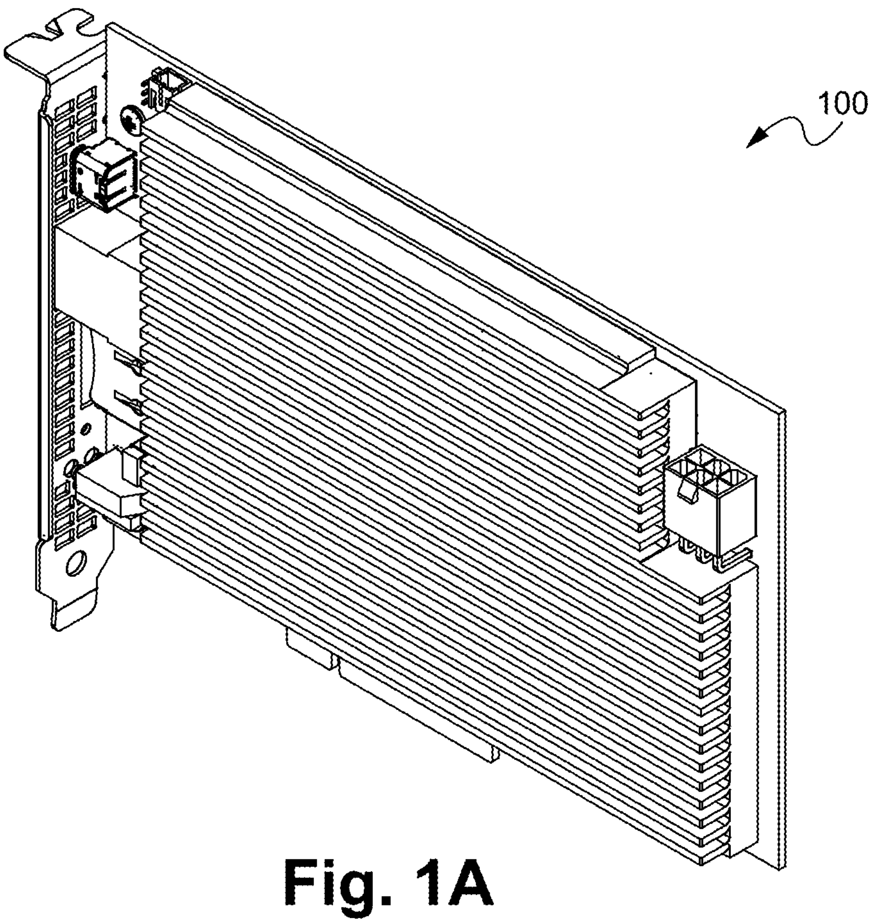
FIG. 1A illustrates a top perspective view of a hardware security module system according to some embodiments.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a hardware security module system, method and device including one or more security meshes that cover portions of a circuit board including the encryption/decryption component for determining if an unwanted physical access of the circuit board is occurring and disabling or erasing the hardware security module to prevent the unauthorized access of encryption data (e.g. encryption keys stored on the encryption/decryption component). Specifically, each trace forming the web of the meshes is able to be electrically coupled with a plurality of mesh contact pads and a plurality of circuit board contact pads such that in order to disable one trace of the mesh an intruder would need to short circuit/bypass each of the plurality of mesh contact pads electrically coupled to that trace in series. Further, the system, method and device is able to include a heat dissipating plate coupled to the circuit board under the security mesh that spreads out heat generated by the circuit board (e.g. the CPU, the encryption/decryption component, a mesh controller and/or other components well known in the art) such that the heat is not centralized in any one location as it is transferred from the circuit board through the mesh to the mesh covers covering the circuit board and out of the system. Moreover, the system, method and device is able to include one or more rigid mesh covers that cover and protect the outside of the meshes from damage and are able to include channels having compressing bodies therein that elastically provide a firm compression between each of the contact pads of the meshes and each of the contact pads of the circuit board when the cover is secured to the circuit board.

As a result, the system, method and device provide the advantage of instead of having a single mesh contact pad for each trace at a single location (thereby creating a single centralized attack point), using multiple trace contact points distributed around the mesh and circuit board for each trace, requiring a series of bypasses distributed around the mesh just to disable a single trace of the mesh. Also, the system, method and device provide the advantage of preventing heat damage to portions of the security mesh that are adjacent to heat generating components by absorbing the heat into the plate and spreading the heat over the larger area of the plate as it is transferred to the mesh. Further, the system, method and device provide the advantage of using compressing bodies that enable the use of conductive adhesive to electrically detachably (non-permanently) couple the mesh contact pads to the circuit board contact pads due to their compression of the mesh and circuit board pads together. Moreover, the compressing bodies further provide the advantage of acting as an anti-lift attack mechanism. In particular, if an attacker were trying to pry the covers/meshes up from the circuit board in order to access the contact pads, the compression makes accessing these pads more difficult and/or makes lifting the cover high enough (to overcome the compression) to access a pad more likely to electrically disconnect another pad connection thereby alerting the circuit of the intrusion (where the security signal is lost and the encryption data is able to be zeroized before it can be accessed).

Figure 1B:
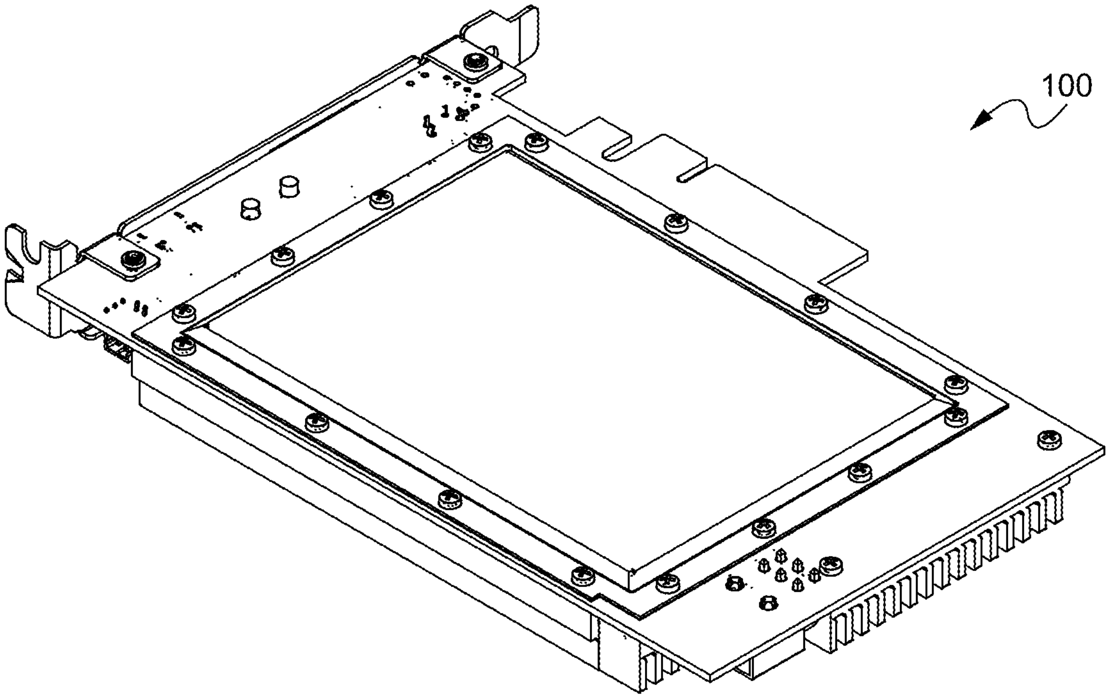
FIG. 1B illustrates a bottom perspective view of a hardware security module system according to some embodiments.
Figure 1C:
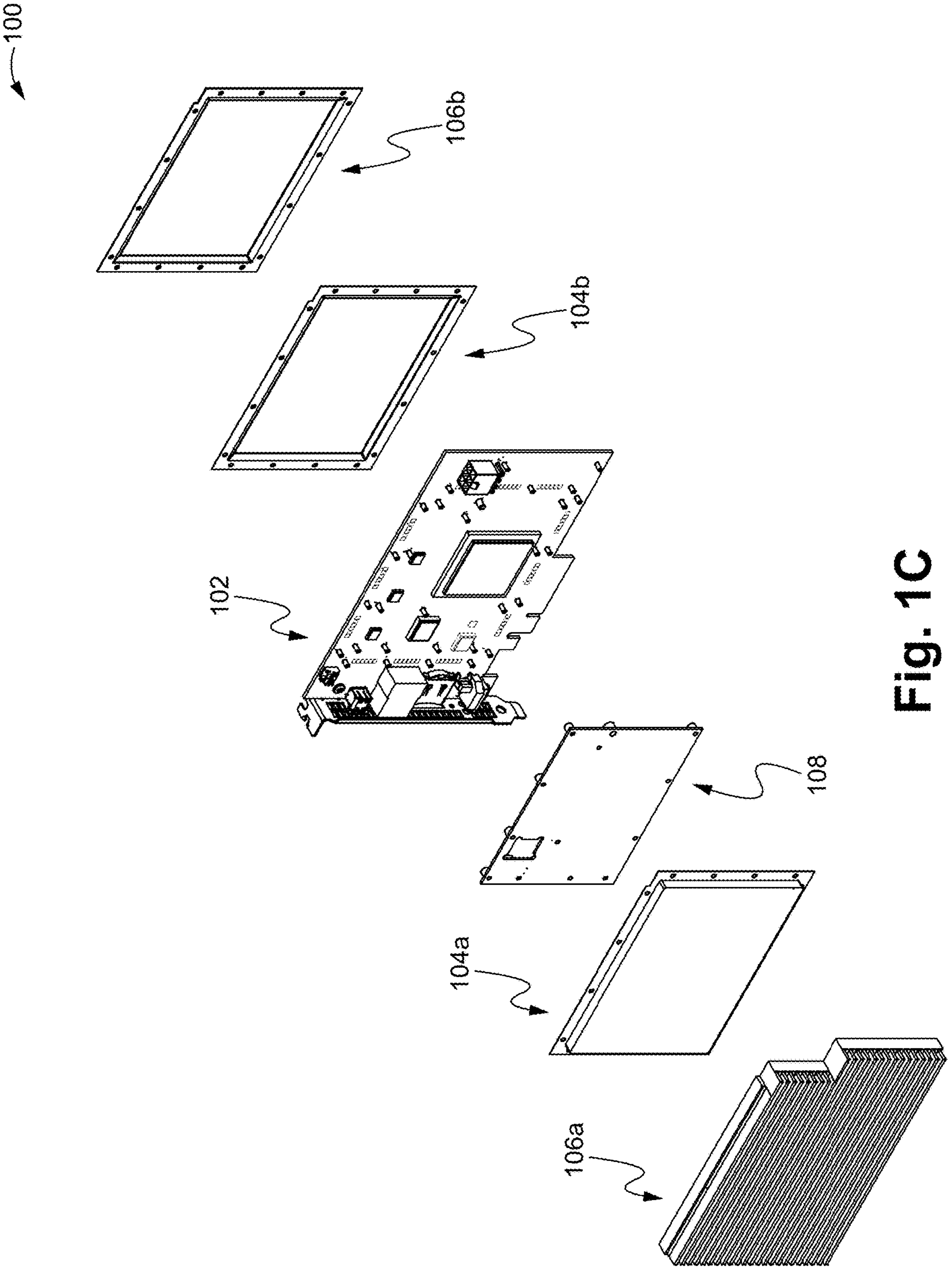
FIG. 1C illustrates an exploded top perspective view of a hardware security module system according to some embodiments.
Figure 2A:
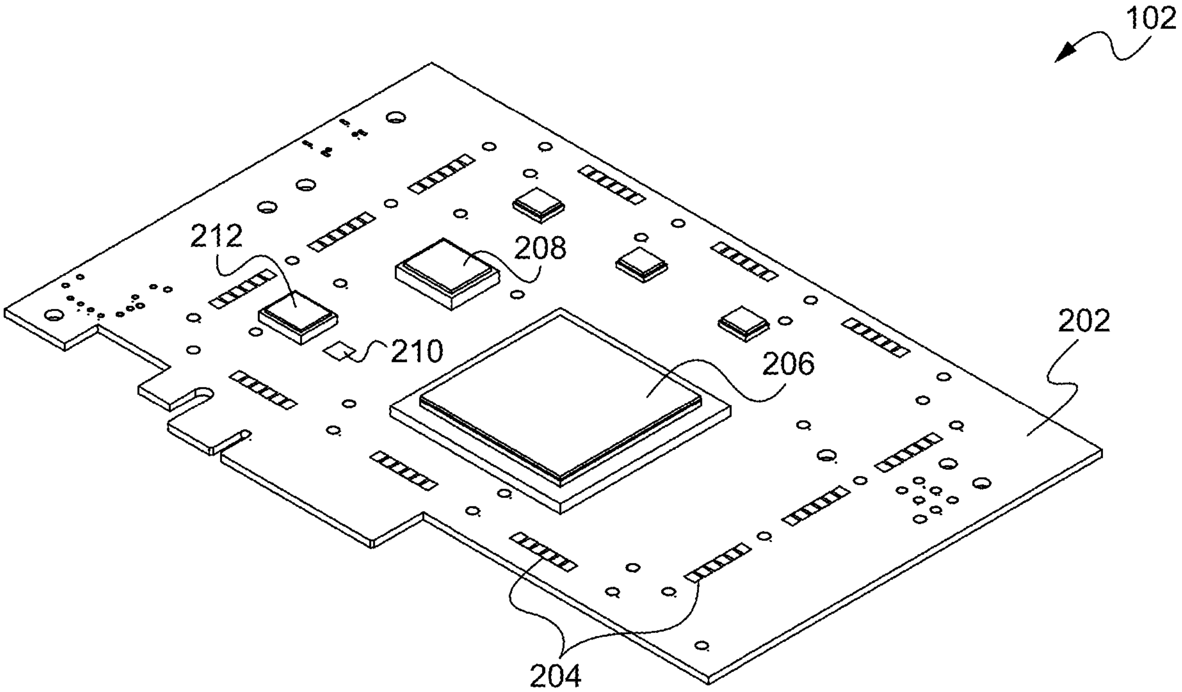
FIG. 2A illustrates a top perspective view of the printed circuit board according to some embodiments.
Figure 2B:
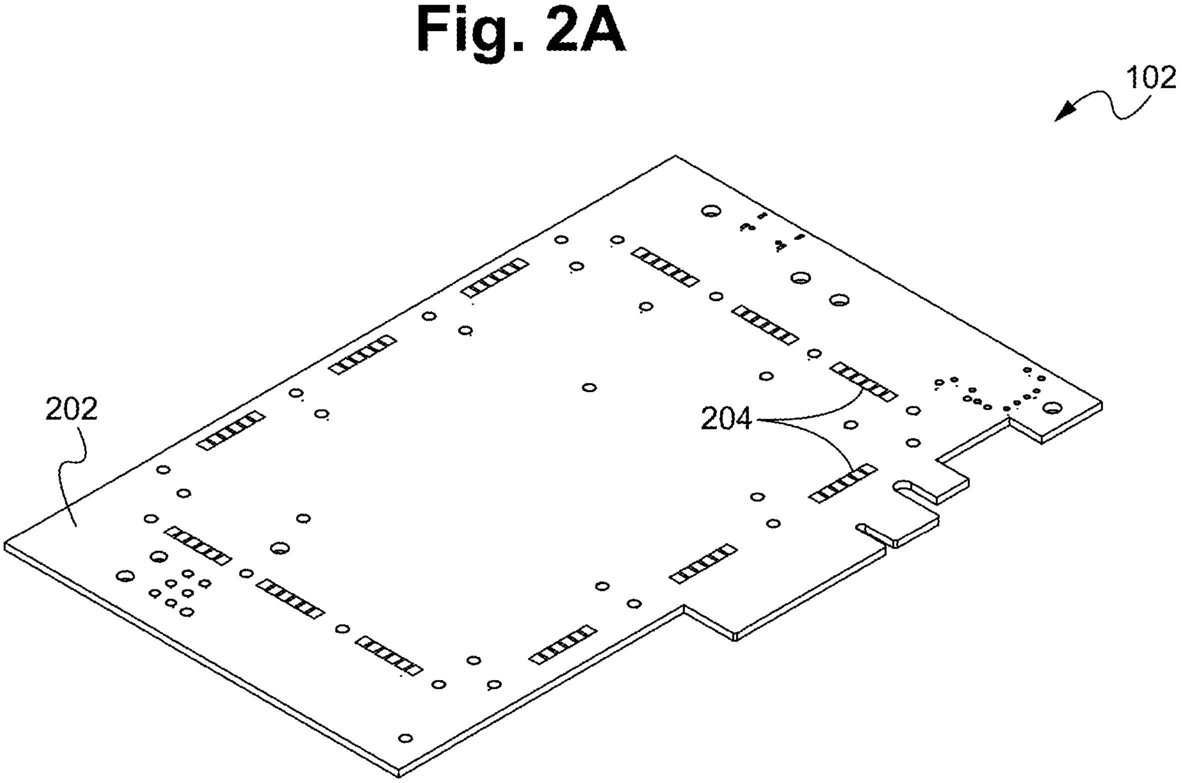
FIG. 2B illustrates a bottom perspective view of the printed circuit board according to some embodiments.
Figure 2C:
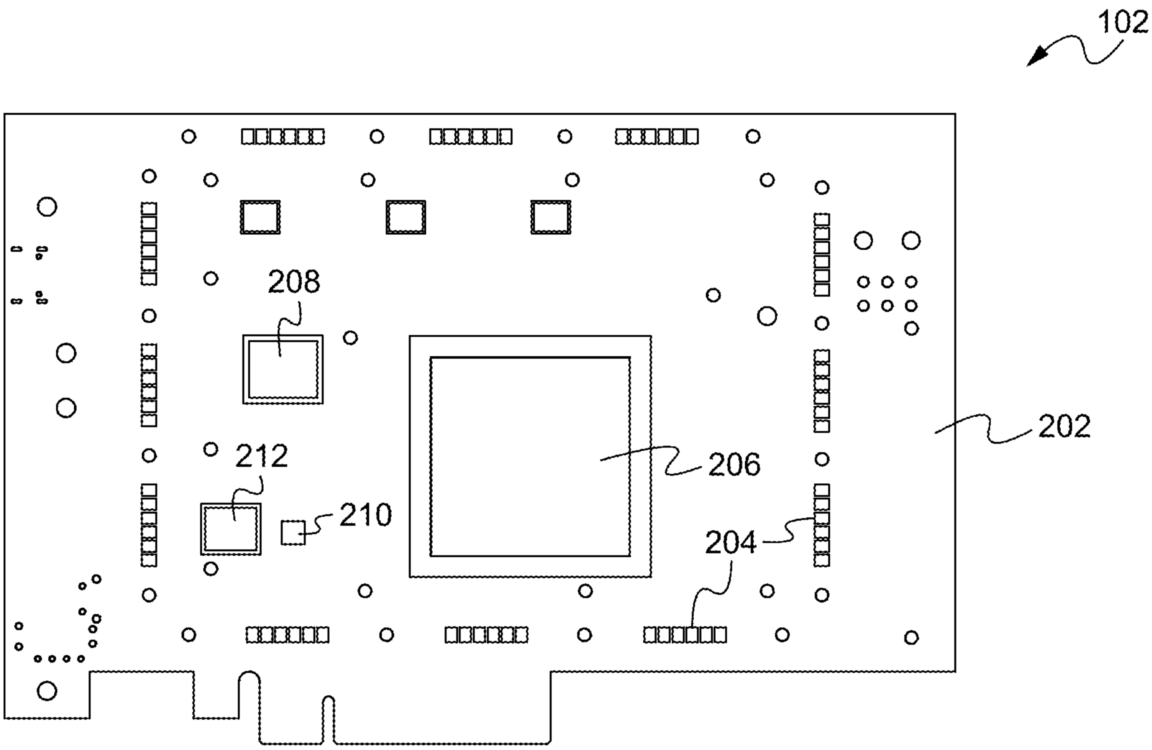
FIG. 2C illustrates a top view of the printed circuit board according to some embodiments.
Figure 2D:
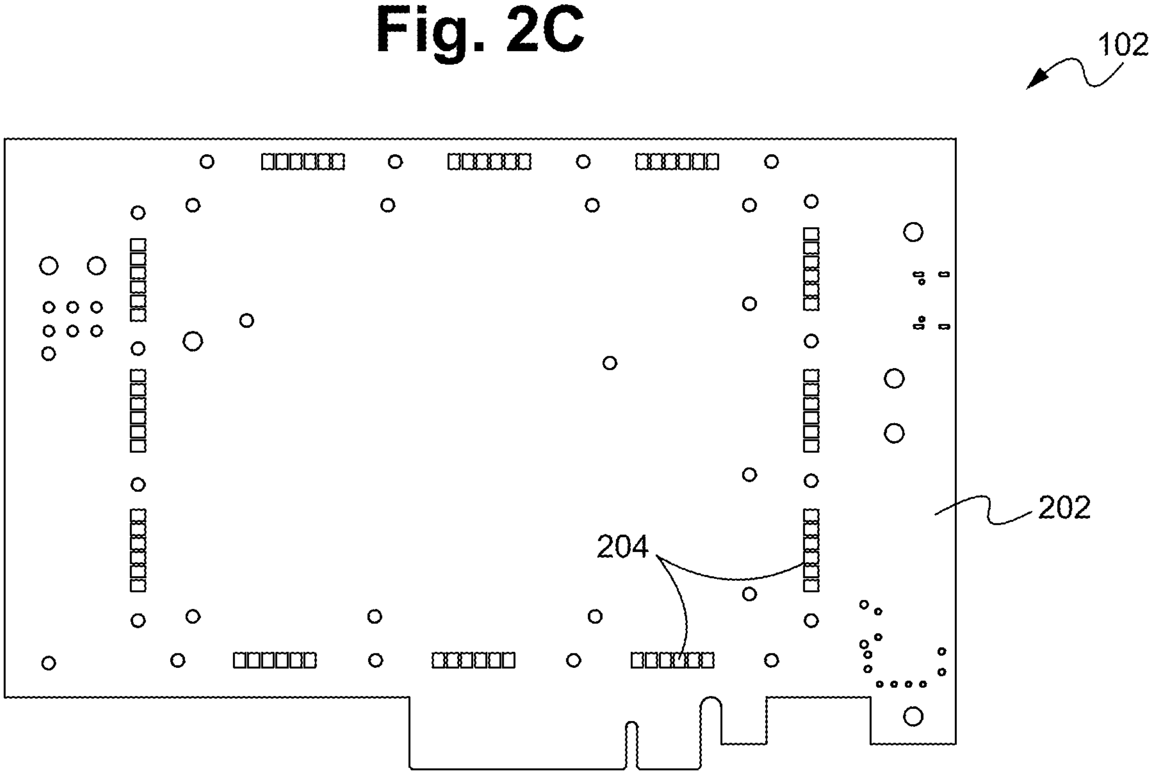
FIG. 2D illustrates a bottom view of the printed circuit board according to some embodiments.
Figure 3A:
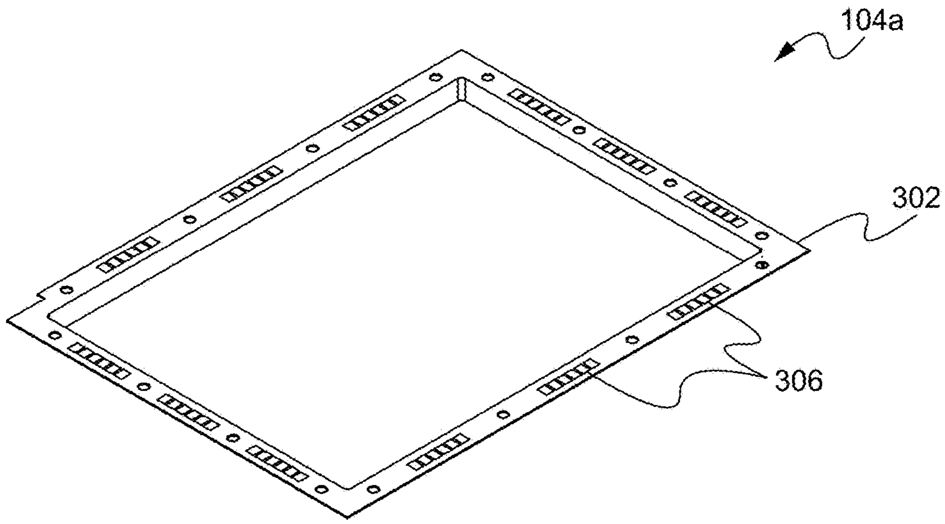
FIG. 3A illustrate a bottom perspective view of the top mesh according to some embodiments.
Figure 3B:
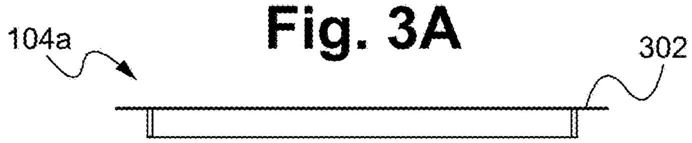
FIG. 3B illustrate a front view of the top mesh according to some embodiments.
Figure 3C:
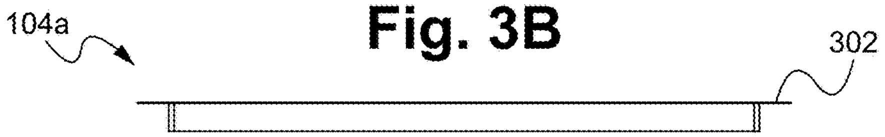
FIG. 3C illustrate a side view of the top mesh according to some embodiments.
Figure 3D:
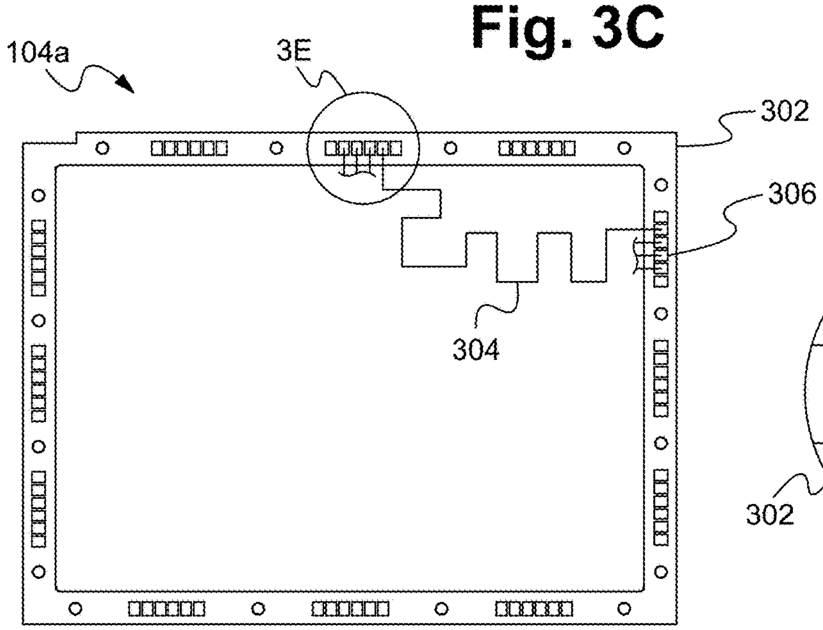
FIG. 3D illustrate a bottom view of the top mesh according to some embodiments.
Figure 3E:
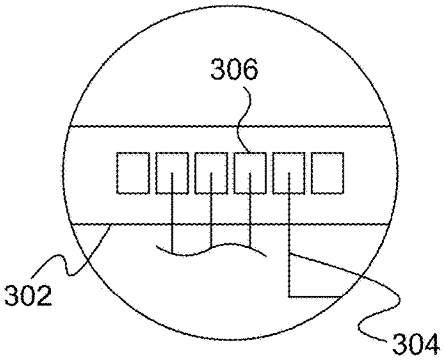
FIG. 3E illustrate a bottom detail view of the circled portion 3E in FIG. 3D according to some embodiments.

FIGS. 1A-C illustrate a top perspective view, a bottom perspective view and an exploded top perspective view of a hardware security module system 100, respectively, according to some embodiments. As shown in FIGS. 1A-C, the hardware security module system 100 comprises a printed circuit board (or printed circuit board assembly) 102, a top mesh 104*a*, a bottom mesh 104*b*, a top cover 106*a*, a bottom cover 106*b* and a heat dissipator plate 108. Alternatively, one or more of the top mesh 104*a*, the bottom mesh 104*b*, the top cover 106*a*, the bottom cover 106*b* and the heat dissipator plate 108 are able to be omitted. The heat dissipator plate 108 is physically coupled to a top side of the printed circuit board 102 adjacent and/or in contact with one or more heat generating components of the circuit board 102 (e.g. central processing unit 206, mesh controller component/circuit/microchip 208, encryption/decryption component 212, memory 210, power supply, integrated circuit/microchip or other components). In some embodiments, the plate 108 is coupled to the printed circuit board 102 by a plurality of screws.

The top mesh 104*a* is physically coupled to the top side of the printed circuit board 102 over the encryption/decryption component 212, the mesh controller 208 and/or the heat dissipator plate 108. In particular, a perimeter of the top mesh 104*a* is physically coupled to a perimeter of the printed circuit board 102 that surrounds at least the encryption/decryption component 212, mesh controller 208 and/or heat dissipator plate 108 on the top side of the board 102. Similarly, the bottom mesh 104*b* is physically coupled to the bottom side of the printed circuit board 102 under the encryption/decryption component 212, mesh controller 208 and/or heat dissipator plate 108. In particular, a perimeter of the bottom mesh 104*b* is physically coupled to a perimeter of the bottom of the printed circuit board 102, the perimeter surrounding the portion of the board 102 under at least one of the encryption/decryption component 212, mesh controller 208 and/or heat dissipator plate 108 on the bottom side of the board 102. As a result, the bottom mesh 104*b* is able to protect against drilling through the bottom of the board 102 to access the components covered by the top mesh 104*a*. In some embodiments, the memory 210 is able to be positioned on the bottom of the board 102 such that it is covered by the bottom mesh 104*b*. In some embodiments, the top and bottom meshes 104*a*, 104*b* are able to be detachably (e.g. non-permanently) coupled to the printed circuit board 102 such that decoupling of the meshes 104*a*, 104*b* does not damage the printed circuit board 102 (although it will alert the mesh controller 208 to disable access to the encryption data and/or keys stored in the encryption/decryption component 212 as described herein).

In some embodiments, some or all of the encryption/decryption component and/or mesh controller (including traces coupled thereto) are exposed on the bottom side of the printed circuit board within the perimeter. Alternatively, the encryption/decryption component and/or mesh controller (including traces coupled thereto) are not exposed on the bottom side, but the bottom mesh 104*b* is able to protect them from any drilling through the bottom side of the board 102 to access them on the top side. In some embodiments, some portions of the perimeter of the top and/or bottom meshes 104*a*, 104*b* are coupled to the board 102 via a non-conductive adhesive whereas other portions of the perimeter of the top and/or bottom meshes 104*a*, 104*b* are coupled to the board 102 via a conductive adhesive (to facilitate electrical coupling between the board contact pads and mesh contact pads as described in detail below). Alternatively, other methods of conductively and/or non-conductively coupling the top and/or bottom meshes 104*a*, 104*b* to the board 102 are able to be used. In some embodiments, the top and/or bottom meshes 104*a*, 104*b* are flexible printed circuits having the features described herein.

FIGS. 2A-D illustrate a top perspective view, a bottom perspective view, a top view and a bottom view of the printed circuit board 102, respectively, according to some embodiments. As shown in FIGS. 2A-D, the printed circuit board 102 comprises a substrate 202 including a plurality of conductive contact pads 204, a central processing unit (CPU) 206, a mesh controller 208, memory 210 and an encryption/decryption component 212 all electrically coupled together via one or more conductive traces/contact pads deposited on and/or through the substrate 202 thereby enabling the operation of the circuit as described herein. Although for the sake of clarity the mesh controller 208 and the encryption/decryption component 212 are described herein and illustrated in FIGS. 2A-D as separate components, it is understood that the mesh controller 208 and the encryption/decryption component 212 are able to be two functions/modules/elements of the same component that performs both of their functions. For example, a single microcontroller unit (MCU) or other computing unit of the circuit board 102 is able to include an encryption/decryption element (hardware and/or software) that performs the encryption/decryption functions described herein and a controller element (hardware and/or software) that performs the mesh controlling functions described herein.

In such embodiments, communications described herein between the mesh controller 208 and the encryption/decryption component 212 are internal communications within the single component and communications described herein to/from the mesh controller 208 and the encryption/decryption component 212 to/from other elements are communications to/from the single component to/from the other elements. Similarly, in such embodiments the electrical and/or physical coupling described herein between the mesh controller 208 and the encryption/decryption component 212 are internal electrical and/or physical coupling within the single component and electrical and/or physical coupling described herein of the mesh controller 208 and the encryption/decryption component 212 with other elements are electrical and/or physical coupling of the single component with the other elements. Further, in such embodiments instead of covering at least multiple positions on the printed circuit board 102 with the meshes 104*a*, 104*b* in order to cover the position of the mesh controller 208 and the position of the encryption/decryption component 212, a single position of the single component including both the mesh controller 208 and the encryption/decryption component 212 is able to be covered as described herein.

A first portion of the conductive contact pads 204 are able to be distributed on a top side of the substrate 202 such that they form a perimeter around at least the encryption/decryption component 212 and the mesh controller 208 on the top side. A second portion of the conductive contact pads 204 are able to be distributed on a bottom side of the substrate 202 mirroring the locations of the first portion of pads 204 on the top side. Alternatively, one or more pads of the second portion of pads 204 are able to not mirror the location of the first portion of pads 204 as long as they still form a perimeter at least around the section of the bottom side opposite where the encryption/decryption component 212 and the mesh controller 208 are located on the top side (and/or sections where the encryption/decryption component 212, the mesh controller 208 and/or portions thereof are exposed/accessible from the bottom side). As a result, the contact pads 204 form (matching or non-matching) perimeters on both the top and bottom side of the substrate 202 that each surround the location of the encryption/decryption component 212 and the controller 208 on the board 102. In some embodiments, the contact pads 204 are able to surround additional components of the board 102 such as the CPU 206 and/or other components described herein.

As shown in FIG. 2, the board 102 comprises 96 contact pads 204 on each side of the substrate 202 (for a total of 192), grouped into sets of six pads 204 symmetrically positioned along the perimeters of each side. Alternatively, the substrate 202 is able to comprise more or less total pads 204, more or less pads 204 on each side (such that the top and bottom sides have equal or unequal amounts of pads 204), pads 204 grouped into larger or smaller sets (or not grouped at all) and/or positioned along different perimeters (as long as the perimeter still surrounds the encryption/decryption component 212 and the controller 208). The contact pads 204 are able to be gold contact pads or other types of conductive contact material. In some embodiments, each of the contact pads 204 is electrically isolated from each other of the contact pads 204 except for through one or more of the other components of the circuit board 102 such as the mesh controller 208 and/or the security meshes 104*a*, 104*b* when coupled to the pads 204.

The encryption/decryption component 212 is able to be a computing component (hardware and/or software) that safeguards and manages cryptographic keys and provides cryptographic processing (e.g. using a cryptographic module). For example, the encryption/decryption component 212 is able to be a physical computing component that provides tamper-evident and intrusion-resistant safeguarding and management of digital keys and other secrets, as well as crypto-processing. Alternatively, the encryption/decryption component 212 is able to be other types of hardware security modules known in the art. As described above, the encryption/decryption component 212 is coupled with at least the CPU 206 and the mesh controller 208 for providing encryption/decryption functions of the circuit board 102 including the storing, generating and/or maintaining of encryption keys.

The mesh controller 208 is able to be a microcontroller or other type of hardware controller and/or a software controller. The mesh controller 208 is operatively coupled with at least the contact pads 204 of the board 102 and the encryption/decryption component 212 for transmitting signals through the meshes 104*a*, 104*b*, detecting signals from the meshes 104*a*, 104*b* (via the contact pads 204) indicating an intrusion attempt, and disabling access to, deleting and/or otherwise protecting the encryption data (e.g. encryption keys, data used to generate encryption keys, or other encryption data) stored in the encryption/decryption component 212. The encryption/decryption component 212 and/or the mesh controller 208 are able to operate in conjunction with and/or independently of the CPU 206 and/or the memory 210. In particular, although shown separately and in a single location in FIG. 2, the memory 210 is able to be located in multiple locations, shared memory, dedicated memory and/or wholly or partially internal memory of the encryption/decryption component 212 and/or the controller 208.

In some embodiments, one or more of the components of the printed circuit board 102 are able to be combined in to a single component and/or divided into multiple components with the overall functionality of the printed circuit board 102 remaining the same. In some embodiments, the printed circuit board 102 is able to comprise one or more additional components such as, but not limited to, power sources, network interfaces, resistors, capacitors, inductors, transistors, physical ports and/or other components known in the art. Similarly, the substrate 202 is able to include a plurality of additional contact pads and/or conductive traces (not shown) for electrically coupling one or more of the embedded components, surface mounted components and/or other components of the printed circuit board 102 together to enable operation of the circuit. Alternatively, one or more of the components are able to be omitted. In some embodiments, the printed circuit board 102 is an LS2-PCI security HSM adapter. Alternatively, the printed circuit board 102 is able to be other types of devices including an encryption/decryption component 212. In some embodiments, the board 102 comprises one or more fastener-receiving elements (e.g. screw-receiving nuts fixed to the board) positioned on the substrate 202 for receiving fasteners (e.g. screws) to secure the cover 106*a*, top mesh 104*a* and/or other components to the circuit board 102.

FIGS. 3A-E illustrates a bottom perspective view, a front view, a side view, a bottom view and a bottom detail view of the top mesh 104*a*, respectively, according to some embodiments. As shown in FIGS. 3A-E, the top mesh 104*a* comprises a flexible body 302 including a plurality of printed or embedded electrically conductive traces 304 each electrically coupled with two or more of a plurality of conductive mesh contact pads 306. The mesh contact pads 306 are exposed on at least one side of the flexible body 302 such that they are able to be electrically coupled with the contact pads 204 on the top side of the printed circuit board 102. The flexible body 302 is able to form a pocket or cavity that fits around the components (and/or heat dissipating plate 108) within the perimeter formed by the contact pads 204 on the top side of the printed circuit board 102. The size, shape and/or perimeter of the flexible body 302 is able to match the perimeter formed by the contact pads 204 on the top side of the printed circuit board 102 such that the perimeter of the flexible body 302 (and its mesh contact pads 306) is able to couple to the perimeter of the top side of the circuit board 102 as described above. Similarly, the mesh contact pads 306 are able to be shaped and/or positioned along the perimeter of the flexible body 302 of the mesh 104*a* such that they form the same pattern and/or relative positioning on the flexible body 302 as the pattern and/or relative positioning of the contact pads 204 on the top side of the printed circuit board 102. Additionally, the quantity and/or grouping of the mesh contact pads 306 is able to match the quantity and/or grouping of the contact pads 204 on the top side of the circuit board 102. As a result, the coupling of the mesh 104*a*, 104*b* to the printed circuit board 102 is able to create an electrical connection between the mesh contact pads and the board contact pads 204 with which they align. In some embodiments, a conductive adhesive is used to couple the portions where the mesh contact pads and the board contact pads 204 meet in order to facilitate the electrically conductive coupling between the aligned pads. Alternatively, the body 302 of the top mesh 104*a* is able to be larger than the perimeter formed by the contact pads 204 on the top side of the board 102, as long as the mesh contact pads 306 are still positioned on the body 302 in the same position relative to each other such that they each are still able to simultaneously align with a different one of the contact pads 204 on the top side of the board 102 when the top mesh 104*a* is coupled to the board 102.

The mesh traces 304 are electrically isolated from each other and form a serpentine or other pattern throughout the flexible body 302 thereby creating a web that blocks an intruders attempts to penetrate the flexible body 302 with contacting one or more of the traces 304 thereby detectably disturbing electrical signals transmitted through the traces 304 and/or contact pads 306 (via the mesh controller 208). For the sake of clarity, only a single trace 304 forming an abbreviated serpentine pattern is labeled and shown in FIG. 3D. However, it is understood that a plurality or all of the contact pads 306 are able to be coupled to a trace 304 and each of the multiple traces 304 are able to form elaborate serpentine pattern or other patterns throughout large portions of the mesh 302 (starting and ending at a different contact pad 306) in order to form the web (having a sufficient density to prevent penetration of the mesh without severing one or more traces and/or disturbing electrical signals transmitted through the traces). In some embodiments, the flexible body 302 comprises a plurality of layers wherein one or more of the traces 304 form their pattern through each of the layers. In particular, in such embodiments the direction of a majority of the traces 304 in a section of a first layer of the body 302 are able to be perpendicular to the direction of a majority of the traces 304 in a section of an adjacent layer of the body 302 (that aligns with the section in the first layer) thereby forming a "cross-hatch" when observing the traces 304 of the sections of the two layers together. Additional layers and non-parallel directions of traces 304 in adjacent layers are able to be used to create increasingly dense webs within the body 302 of the mesh 104*a*.

In some embodiments, the body 302 is able to be a flexible printed circuit including the embedded and/or printed mesh traces 304 and mesh contact pads 306. In some embodiments, the mesh traces 304 are able to be silver ink traces and the body is able to be polyester. Alternatively, the one or more of the mesh traces 304 are able to be formed by other conductive materials and/or the body 302 is able to be formed of one or more other materials or a combination thereof. Although as shown in FIG. 3, the mesh 104 comprises a plurality of traces 304 each coupled with a subset of 96 mesh contact pads 306, more or less traces 304 and/or contact pads 306 are able to be used with each trace 304 coupled to equal or unequal sized subsets of the mesh contact pads 306 (wherein each contact pad 306 is at most integrally electrically coupled with a single one of the traces 304). In some embodiments, the body 302 is able to comprise one or more screw holes for receiving screws used to couple the cover 106*a* to the circuit board 102.

The bottom mesh 104*b* is able to be substantially similar to the top mesh 104*a* except for the differences described herein. For example, if the shape, size, quantity and/or perimeter formed by the second contact pads 204 on the bottom side of the board 102 differs from that of the first contact pads 204 on the top side of the board 102, the bottom mesh 104*b* is able to correspondingly differ in body shape, body size, mesh contact pad 306 quantity and/or body perimeter from the top mesh 104*a* in order for the contact pads and/or body 302 of the bottom mesh 104*b* to align with the shape, size, quantity and/or perimeter formed by the second contact pads 204 on the bottom side of the board 102. Similarly, the pocket within the body 302 of the bottom mesh 104*b* is able to be sized and shaped to receive the components of the printed circuit board 102 within the perimeter formed by the contact pads 204 on the bottom side of the board 102 (rather than those on the top side as with the top mesh 104*a*).

When mesh contact pads 306 of the top and bottom meshes 104*a*, 104*b* are electrically coupled with the contact pads 204 of the top and bottom of the printed circuit board 102, along with the internal traces of the substrate 202 and the mesh controller 208, the traces 304 of the top and bottom meshes 104*a*, 104*b* form a plurality (e.g. four) electrical paths. Each of these electrical paths serially electrically couple the mesh controller 208 (e.g. via board 102 traces coupled thereto) with a plurality of the mesh contact pads 306 in one or both of the top and bottom meshes 104*a*, 104*b*, one or more traces 304 in one or both of the top and bottom meshes 104*a*, 104*b*, a plurality of the board contact pads 204 in on one or both of the top side and the bottom side of the board 102 and then back to the mesh controller 208 (e.g. forming an electrical loop). As a result, the mesh controller 208 is able to transmit electrical signals through the electrical paths through one or both of the meshes 104*a*, 104*b* and receive the signals back as they complete their electrical loop. This provides the advantage of enabling the mesh controller 208 to determine if there has been an attempted intrusion based on a deviation of the received signals from their normal parameters. For example, if an intruder attempts to access the components of the circuit board 102 (e.g. the encryption/decryption component 212 or the controller 208 itself), any electrical signal changes caused by the intrusion will be detected by the controller 208 which can then shut down, secure, or otherwise protect the data within the encryption/decryption component 212 and/or other components. Additionally, because of the use of multiple contact pads 306/204 positioned in multiple locations (with the electrical paths/loops including multiple pads/locations), the system provides the advantage of instead of having a single mesh contact pad for each trace at a single location (thereby creating a single centralized attack point), requiring a series of bypasses distributed around the mesh just to disable a single trace (or path) of the mesh.

FIGS. 4A-F illustrate a top perspective view, a bottom perspective view, a top view, a side view, a bottom view and a side cross sectional view of the heat sink cover 106*a*, respectively, according to some embodiments. As shown in FIGS. 4A-F, the heat sink cover 106*a* comprises a base 402, one or more cooling fins 404 extending from the base 402, a receiving cavity 406 and one or more fastening apertures 408. Alternatively, one or more of the cooling fins 404 and/or fastening apertures 408 are able to be omitted. For example, fins 404 are able to be omitted such that the heat sink cover 106*a* is substantially similar to the bottom cover 106*b* if heat dissipation is not necessary for the cover 106*a*. The heat sink cover 106*a* is able to be rigid in order to provide physical protection to the top mesh 104*a* and the top side of the printed circuit board 102 when they are within the receiving cavity 406 and the cover 106*a* is coupled to the board 102. In some embodiments, the heat sink cover 106*a* is able to be formed by metal. Alternatively, the cover 106*a* is able to be formed by one or a combination of materials such as metals, plastics, or other materials.

The receiving cavity 406 is able to be sized such that the pocket of the top mesh 104*a* and the components (and/or heat dissipating plate 108) within the perimeter formed by the contact pads 204 on the top side of the printed circuit board 102 fit within the cavity 406 when the cover 106*a* is coupled to the board 102. The size, shape and/or perimeter of the base 402 is able to match the perimeter formed by the mesh contact pads 306 on the top mesh 104*a* as well as the perimeter formed by the contact pads 204 on the top side of the printed circuit board 102 such that, when the cover 106*a* is coupled to the board 102, the perimeter of the base 402 presses the perimeter of the top mesh 104*a* (and/or the mesh contact pads 306) against the perimeter of the top side of the printed circuit board 102 (and/or the board contact pads 204).

Figure 4A:
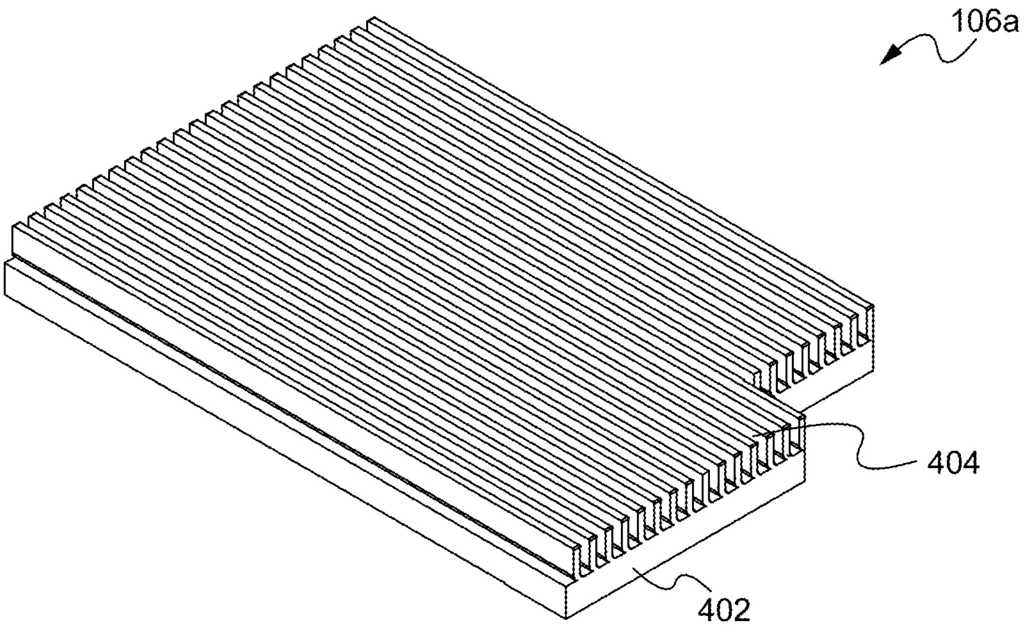
FIG. 4A illustrates a top perspective view of the heat sink cover according to some embodiments.
Figure 4B:
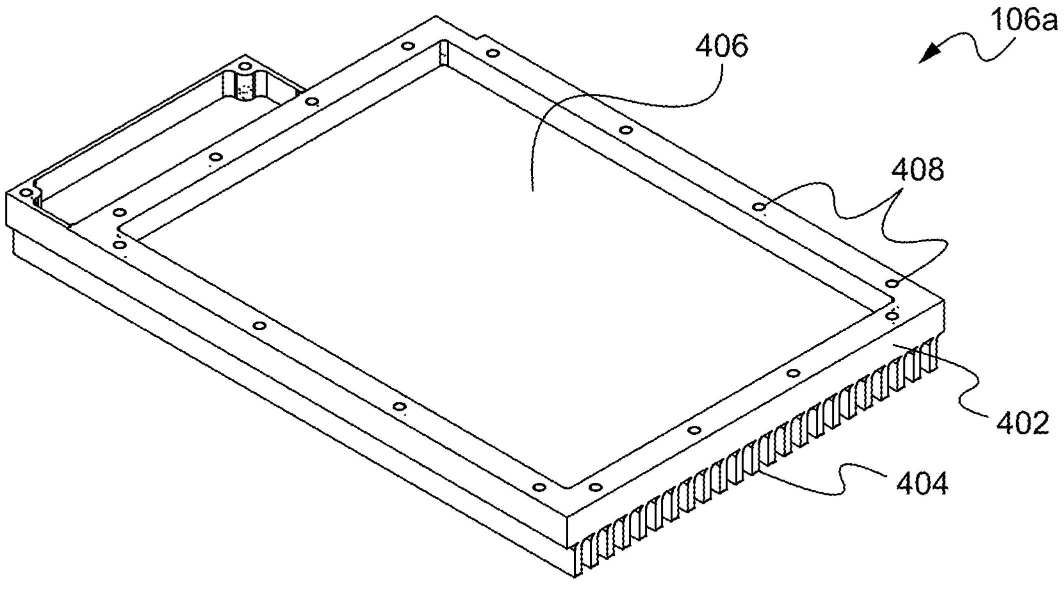
FIG. 4B illustrates a bottom perspective view of the heat sink cover according to some embodiments.
Figure 4C:
FIG. 4C illustrates a top view of the heat sink cover according to some embodiments.
Figure 4D:
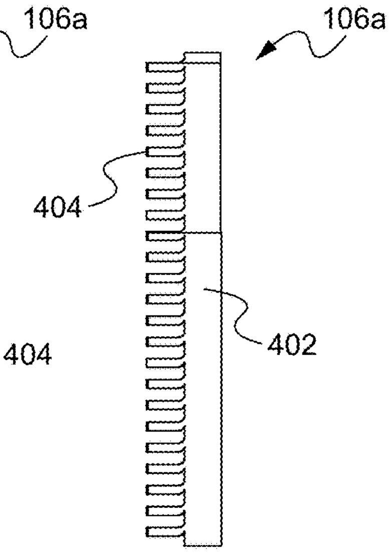
FIG. 4D illustrates a side view of the heat sink cover according to some embodiments.
Figure 4E:
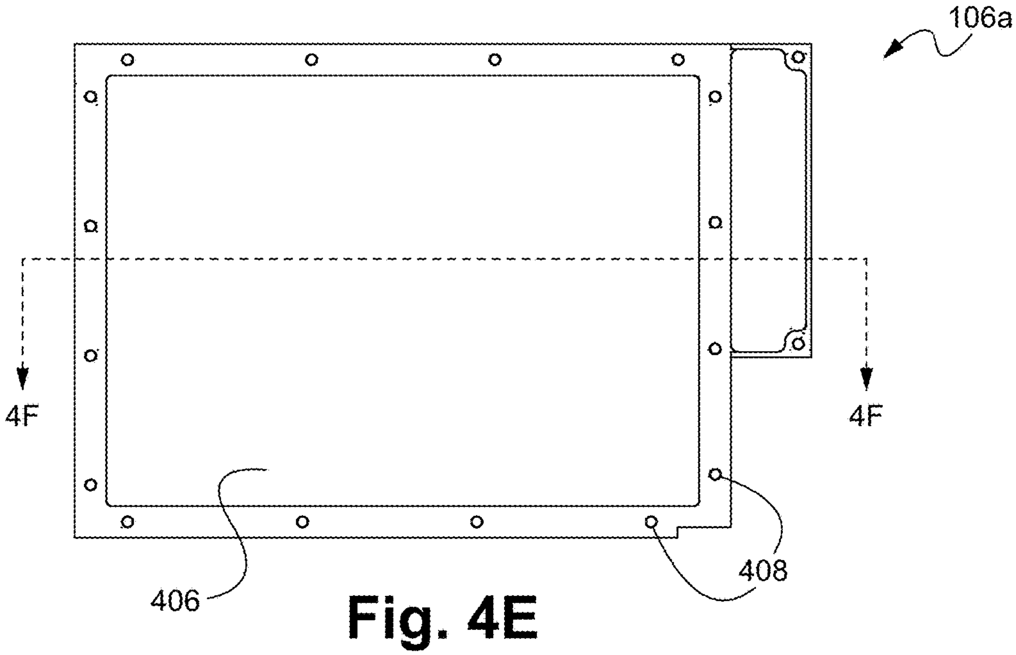
FIG. 4E illustrates a bottom view of the heat sink cover according to some embodiments.
Figure 4F:
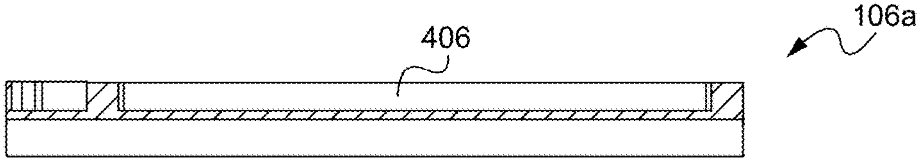
FIG. 4F illustrates a side cross sectional view of the heat sink cover at the cross sectional line 4F shown in FIG. 4E according to some embodiments.
Figure 4G:
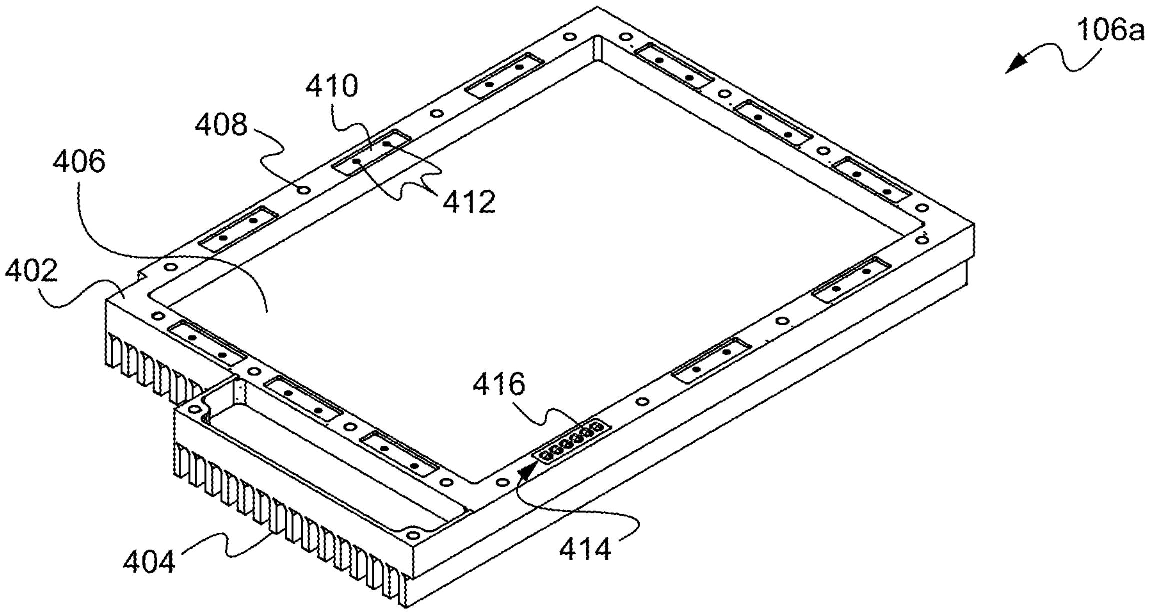
FIG. 4G illustrates a bottom perspective view of the heat sink cover including channels according to some embodiments.
Figure 4H:
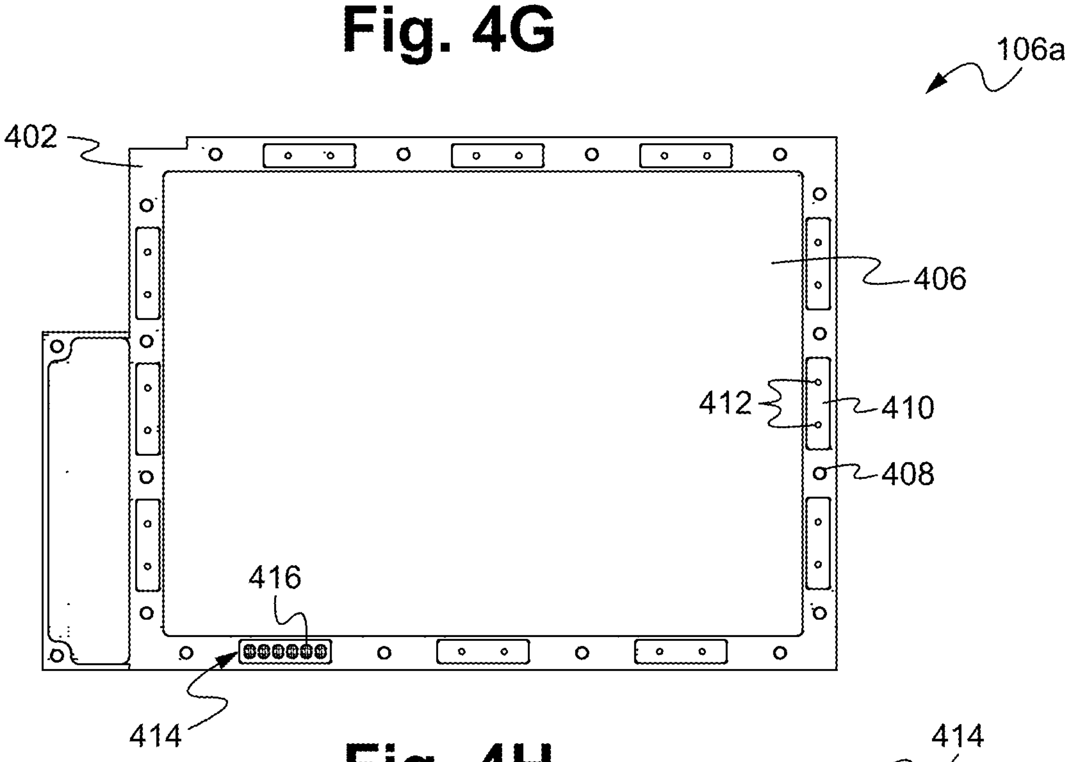
FIG. 4H illustrates a bottom view of the heat sink cover including channels according to some embodiments.
Figure 4I:
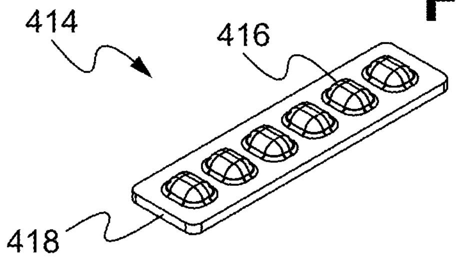
FIG. 4I illustrates a top perspective view of a compression element according to some embodiments.
Figure 4J:
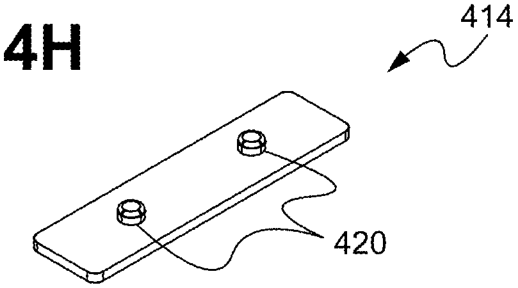
FIG. 4J illustrates a bottom perspective view of a compression element according to some embodiments.

The top mesh 104*a* is able to be coupled within the receiving cavity 406 and to the perimeter of the base 402 of the heat sink cover 106*a* via a non-conductive adhesive. Further, the heat sink cover 106*a* is able to couple to the board 102 via one or more fasteners (e.g. screws) that extend through the fastening apertures 408 (through the holes within the top mesh 104*a*) and into fastener receiving elements (e.g. screw-receiving nuts fixed to the board) of the printed circuit board 102. In some embodiments, as shown in FIGS. 4G and 4H, the perimeter of the base 402 is able to comprise one or more channels 410 and one or more elastic compression elements or bodies 414 positioned within each of the channels 410 for increasing the compression of the mesh contact pads 306 against the contact pads 204 of the circuit board 102 when the cover 106*a* is coupled to the board 102. In particular, as shown in FIGS. 4I and 4J, the elastic compression elements 414 are able to comprise a slab 418 and one or more bumps or protrusions 416 that extend away from one side of the slab 418. The slab 418 is sized such that it fits within the corresponding channel 410 and is flush with the surface of the base 402 that immediately surrounds the channel 410. Additionally, the bumps 416 are aligned with the contact pads 204, 306 of both the top mesh 104*a* and the printed circuit board 102 when the cover 106*a* is coupled to the board 102. As a result, the bumps 416 extend beyond the surface of the base 402 surrounding the channel 410 and are compressed between the channel 410 and the board contact pads 204 when the cover 106*a* is coupled to the board 102. The bumps 416 (and their elastic properties) thereby provide the advantage of applying increased pressure and better contact between the mesh contact pads 306 and the board contact pads 204 (and/or the conductive adhesive therebetween).

In some embodiments, as shown in FIGS. 4G-4J, the channels 410 include one or more holes 412 and the back of the slabs 418 include one or more alignment rods 410 extending out from the back of the slab 418 that fit within the holes 412 of the corresponding channel 410. As a result, the holes 412 and rods 420 facilitate the proper alignment and secure positioning of the compression elements 414 within the channels 410. Although as shown in FIGS. 4G-4J, the compression elements 414 include two rods 420 and the channels 410 include two holes 412, more or less rods 420 and/or holes 412 are able to be used. Alternatively, the one or more holes 412 and/or the one or more alignment rods 420 are able to be omitted. In some embodiments, the compression elements 414 are made of rubber, silicone, other elastic materials and/or a combination thereof.

FIG. 5A-F illustrate a top perspective view, a bottom perspective view, a top view, a side view, a bottom view and a side cross sectional view of the bottom cover 106*b* according to some embodiments. The bottom cover 106*b* is able to be substantially similar to the heat sink cover 106*a* except for the differences described herein. As shown in FIGS. 5A-F, the bottom cover 106*a* comprises a base 502, a receiving cavity 506 and one or more fastening apertures 508. Alternatively, one or more of the fastening apertures 508 are able to be omitted. The bottom cover 106*b* is able to be rigid in order to provide physical protection to the bottom mesh 104*b* and the bottom side of the printed circuit board 102 when they are within the receiving cavity 506 and the cover 106*b* is coupled to the board 102. In some embodiments, the bottom cover 106*b* is able to be formed by metal. Alternatively, the cover 106*b* is able to be formed by one or a combination of materials such as metals, plastics, or other materials.

The receiving cavity 506 is able to be sized such that the pocket of the bottom mesh 104*b* and the components within the perimeter formed by the contact pads 204 on the bottom side of the printed circuit board 102 fit within the cavity 506 when the cover 106*b* is coupled to the board 102. The size, shape and/or perimeter of the base 502 is able to match the perimeter formed by the mesh contact pads 306 on the bottom mesh 104*b* as well as the perimeter formed by the contact pads 204 on the bottom side of the printed circuit board 102 such that, when the cover 106*b* is coupled to the board 102, the perimeter of the base 502 presses the perimeter of the bottom mesh 104*b* (and/or the mesh contact pads 306) against the perimeter of the bottom side of the printed circuit board 102 (and/or the board contact pads 204).

Figure 5A:
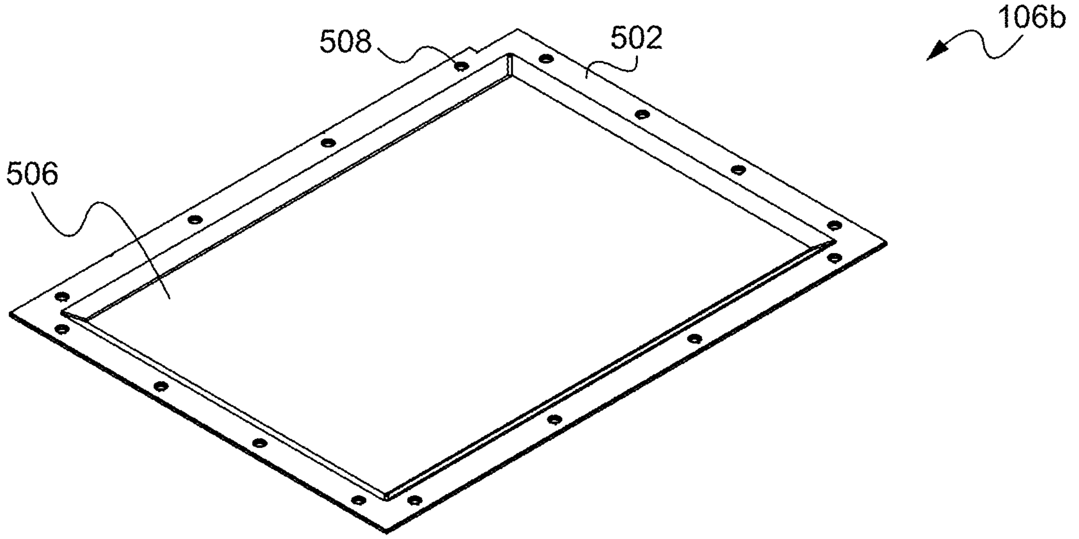
FIG. 5A illustrates a top perspective view of the bottom cover according to some embodiments.
Figure 5B:
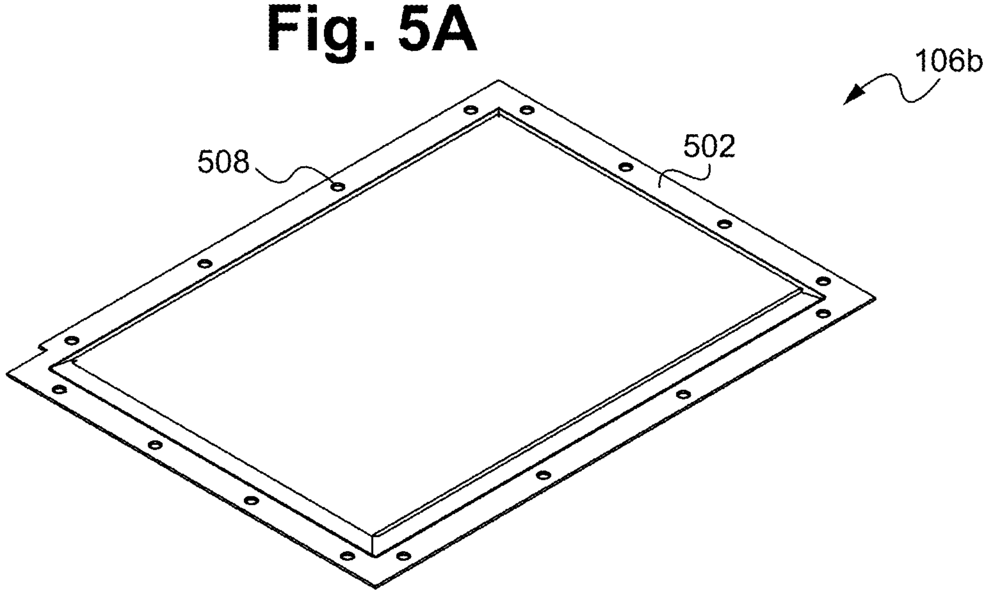
FIG. 5B illustrates a bottom perspective view of the bottom cover according to some embodiments.
Figure 5C:
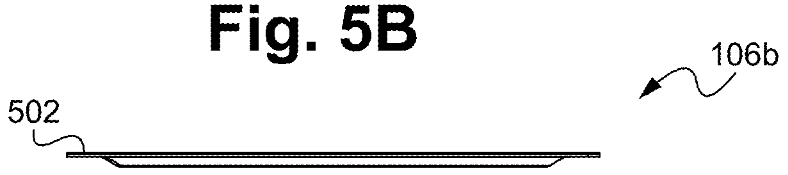
FIG. 5C illustrates a top view of the bottom cover according to some embodiments.
Figure 5D:
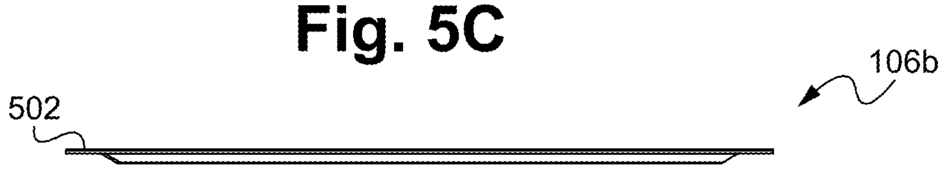
FIG. 5D illustrates a side view of the bottom cover according to some embodiments.
Figure 5E:
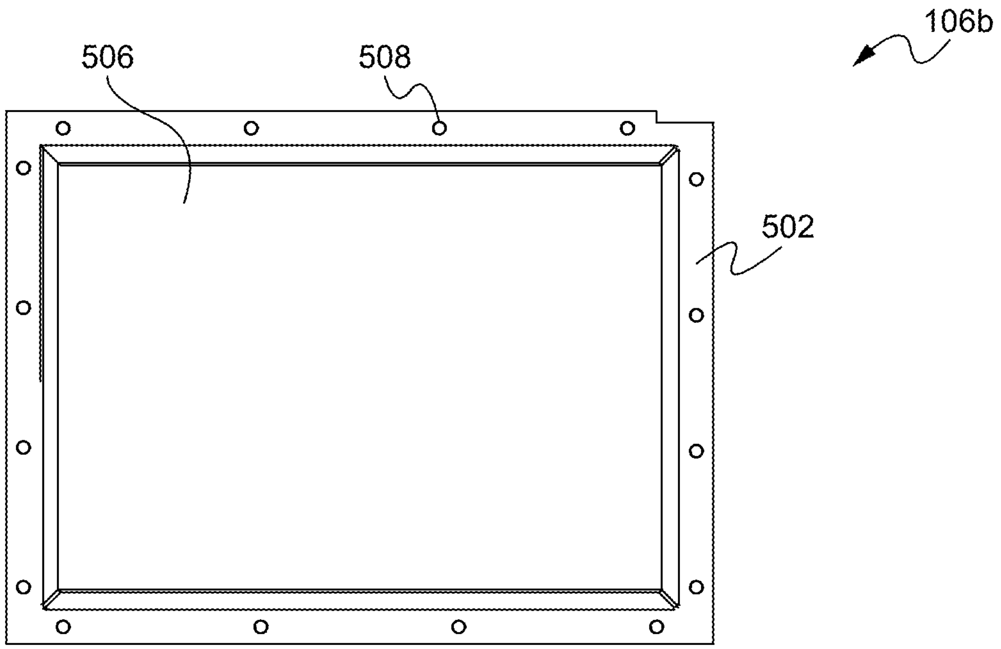
FIG. 5E illustrates a bottom view of the bottom cover according to some embodiments.
Figure 5F:
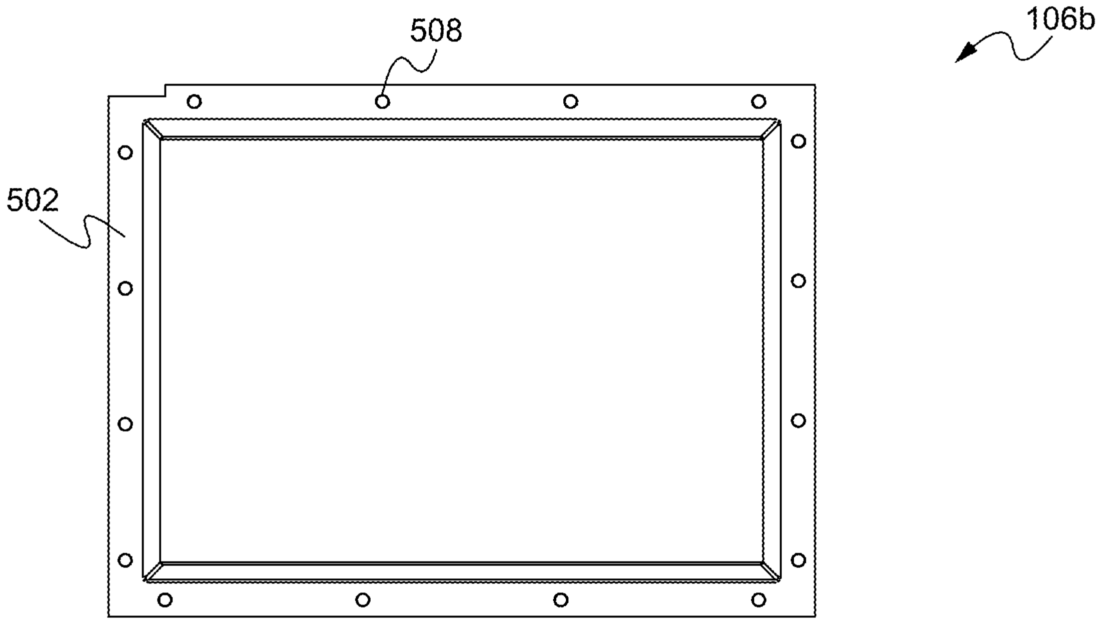
FIG. 5F illustrates a side cross sectional view of the bottom cover at the cross sectional line shown in FIG. 5E according to some embodiments.
Figure 5G:
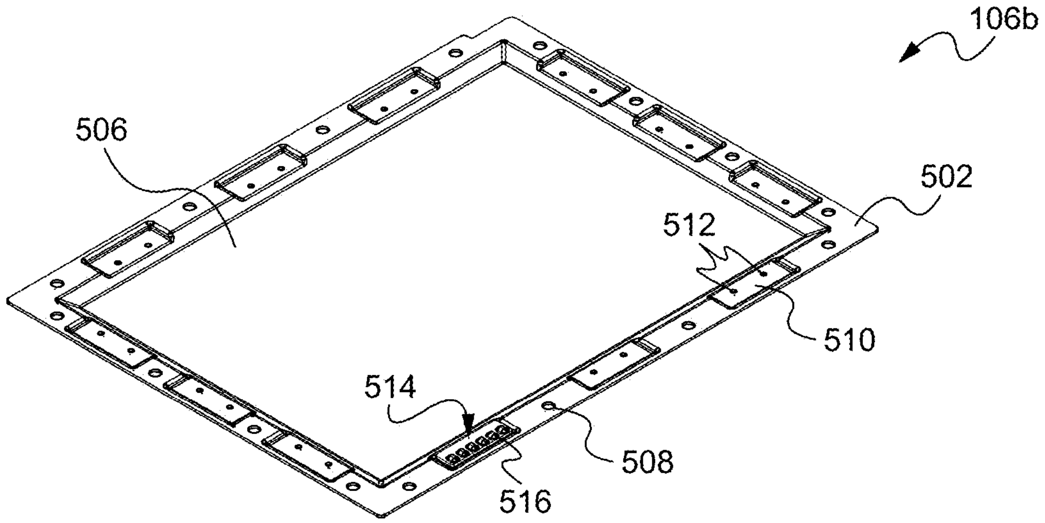
FIG. 5G illustrates a bottom perspective view of the bottom cover including channels according to some embodiments.
Figure 5H:
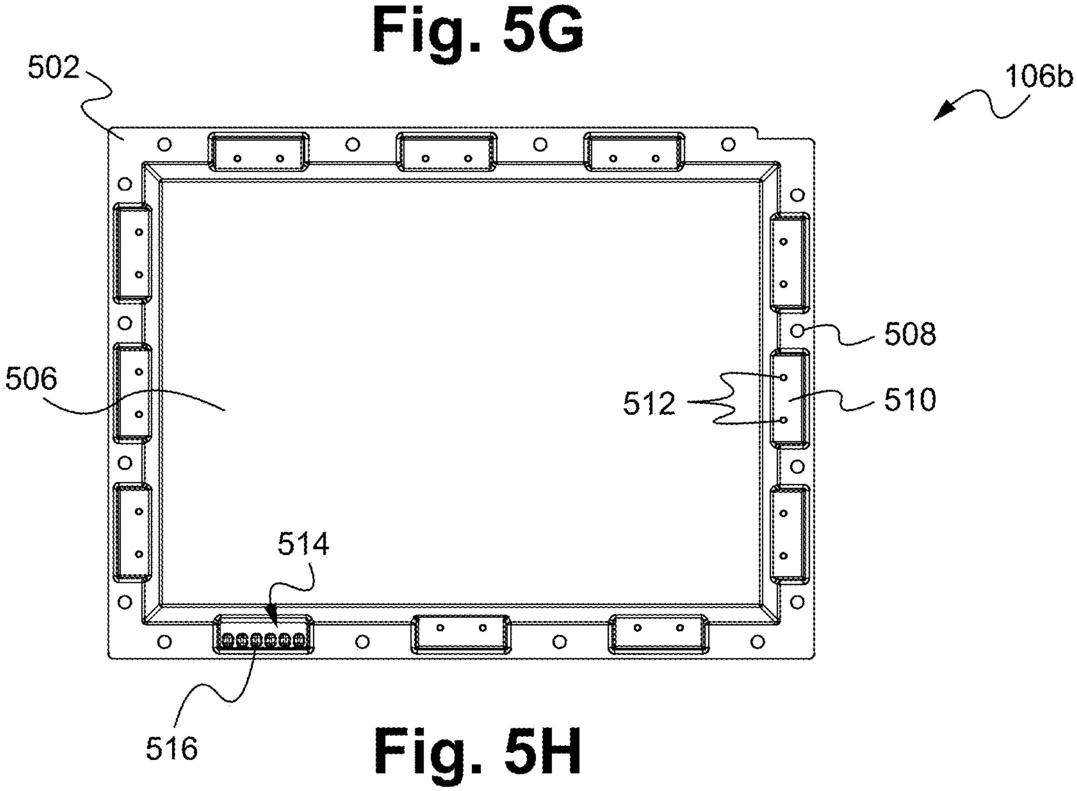
FIG. 5H illustrates a bottom view of the bottom cover including channels according to some embodiments.
Figure 5I:
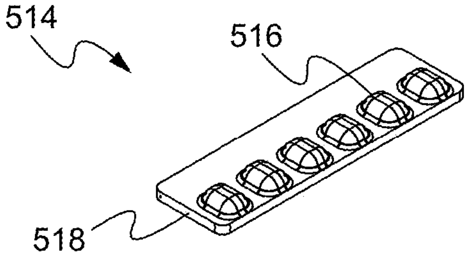
FIG. 5I illustrates a top perspective view of a compression element according to some embodiments.
Figure 5J:
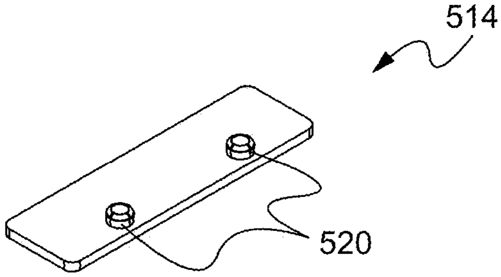
FIG. 5J illustrates a bottom perspective view of a compression element according to some embodiments.
Figure 6A:
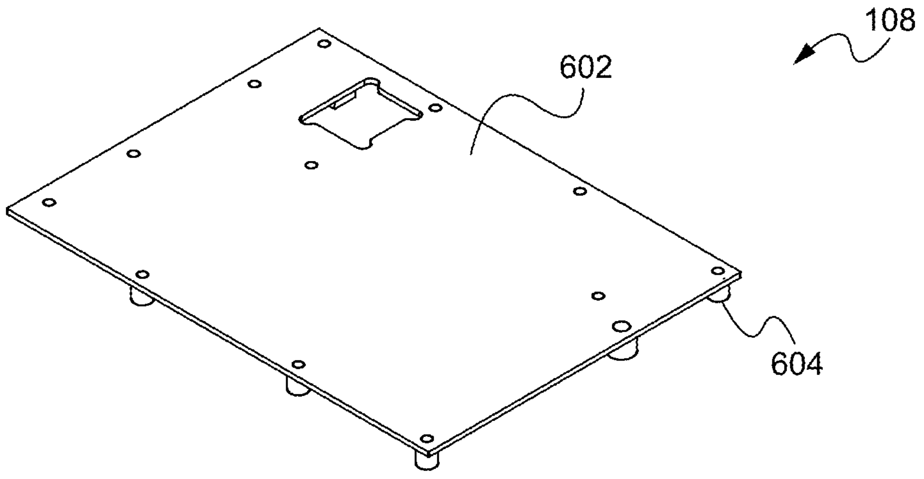
FIG. 6A illustrates a top perspective view of the heat dissipator plate according to some embodiments.
Figure 6B:
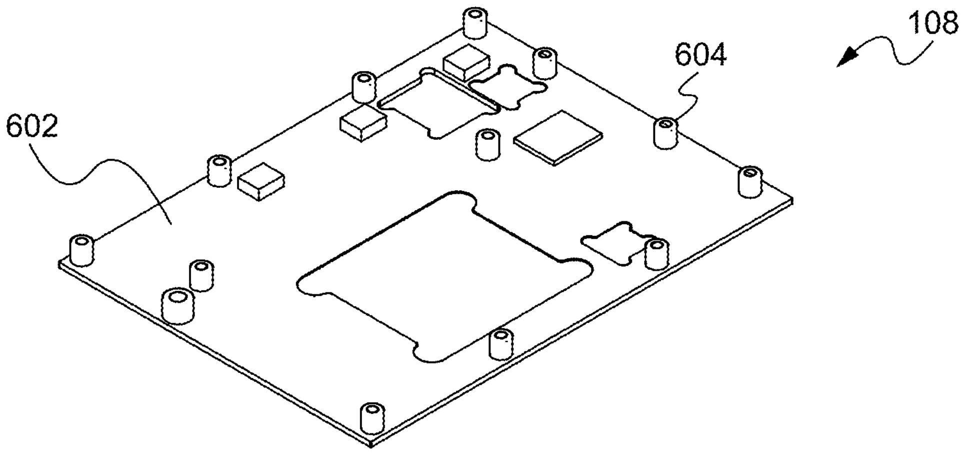
FIG. 6B illustrates a bottom perspective view of the heat dissipator plate according to some embodiments.
Figure 6C:
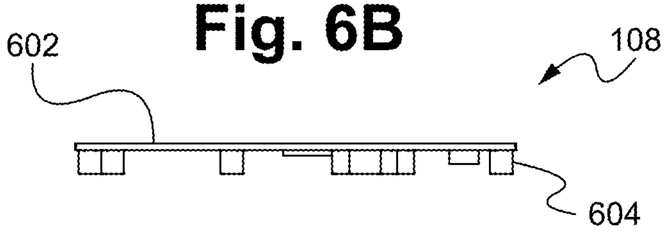
FIG. 6C illustrates a front view of the heat dissipator plate according to some embodiments.
Figure 6D:
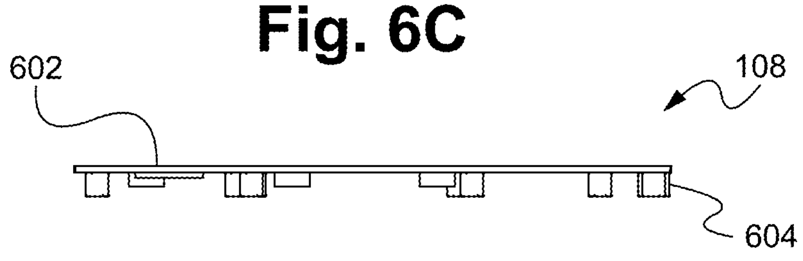
FIG. 6D illustrates a side view of the heat dissipator plate according to some embodiments.
Figure 6E:
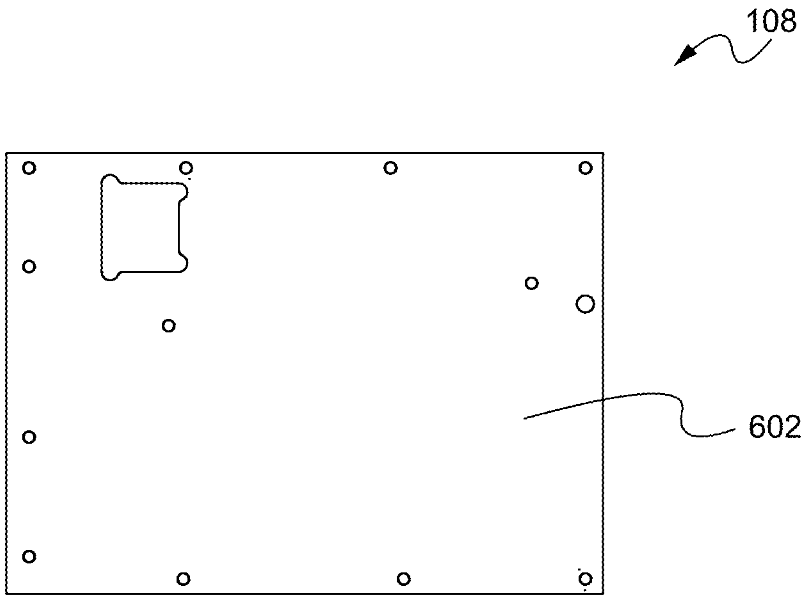
FIG. 6E illustrates a top view of the heat dissipator plate according to some embodiments.
Figure 6F:
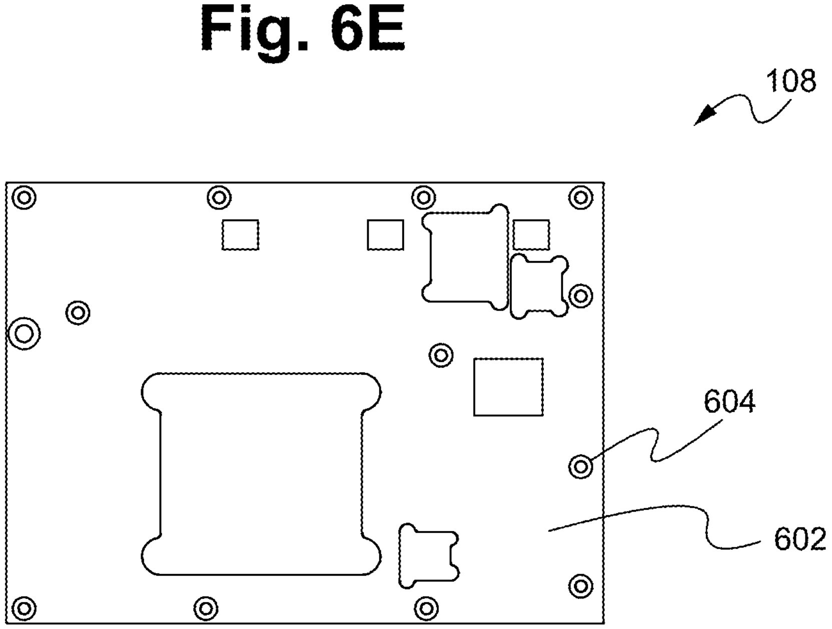
FIG. 6F illustrates a bottom view of the heat dissipator plate according to some embodiments.

The bottom mesh 104*b* is able to be coupled within the receiving cavity 506 and to the perimeter of the base 502 of the bottom cover 106*b* via a non-conductive adhesive. Further, the bottom cover 106*b* is able to couple to the board 102 via one or more fasteners (e.g. screws) that extend through the fastening apertures 508 (through the holes within the bottom mesh 104*b*) and into fastener receiving elements (e.g. screw-receiving nuts fixed to the board) of the printed circuit board 102. In some embodiments, as shown in FIGS. 5G and 5H, the perimeter of the base 502 is able to comprise one or more channels 510 and one or more elastic compression elements 514 positioned within each of the channels 510 for increasing the compression of the mesh contact pads 306 against the contact pads 204 of the circuit board 102 when the cover 106*b* is coupled to the board 102. In particular, as shown in FIGS. 5I and 5J, the elastic compression elements 514 are able to comprise a slab 518 and one or more bumps or protrusions 516 that extend away from one side of the slab 518. The slab 518 is sized such that it fits within the corresponding channel 510 and is flush with the surface of the base 502 that immediately surrounds the channel 510. Additionally, the bumps 516 are aligned with the contact pads 204, 306 of both the bottom mesh 104*b* and the printed circuit board 102 when the cover 106*b* is coupled to the board 102. As a result, the bumps 516 extend beyond the surface of the base 502 surrounding the channel 510 and are compressed between the channel 510 and the board contact pads 204 when the cover 106*b* is coupled to the board 102. The bumps 516 (and their elastic properties) thereby provide the advantage of applying increased pressure and better contact between the mesh contact pads 306 and the board contact pads 204 (and/or the conductive adhesive therebetween).

In some embodiments, as shown in FIGS. 5G-J, the channels 510 include one or more holes 512 and the back of the slabs 518 include one or more alignment rods 510 extending out from the back of the slab 518 that fit within the holes 512 of the corresponding channel 510. As a result, the holes 512 and rods 520 facilitate the proper alignment and secure positioning of the compression elements 514 within the channels 510. Although as shown in FIGS. 5G-J, the compression elements 514 include two rods 520 and the channels 510 include two holes 512, more or less rods 520 and/or holes 512 are able to be used. Alternatively, the one or more holes 512 and/or the one or more alignment rods 520 are able to be omitted. In some embodiments, the compression elements 514 are made of rubber, silicone, other elastic materials and/or a combination thereof.

FIGS. 6A-F illustrate a top perspective view, a bottom perspective view, a front view, a side view, a top view and a bottom view of the heat dissipator plate 108, respectively, according to some embodiments. As shown in FIGS. 6A-F, the heat dissipator plate 108 comprises a dissipator sheet 602 and a plurality of connection rods 604 for coupling the plate 108 to the board 102. In some embodiments, the sheet 602 and the rods 604 are integrally formed as a single continuous piece. Alternatively, one or more of the rods 604 are able to be physically attached to the sheet 602 (e.g. via press fitting, snap fit, threaded connection, or other methods of physical attachment). The heat dissipator plate 108 is able to fit within the pocket of the top mesh 104*a* and/or the cavity 406 of the heat sink cover 106*a* and be positioned over the heat generating components (e.g. the CPU 206, the encryption/decryption component 212, the mesh controller 208, the memory 210 and/or other components) of the printed circuit board 102. The sheet 602 is able to be metal or other heat conducting material or combination of materials. The sheet 602 is able to have a size, area and/or perimeter that is larger than the size, area and/or perimeter of the heat generating components of the printed circuit board 102.

The connection rods 604 are able to facilitate connection to the substrate 202 of the board 102 (e.g. via screws that protrude through the board 102 and screw into the connection rods 604). The connection rods 604 are able to have a height equal to slightly greater than a height of one or more of the central processing unit (CPU) 206, the mesh controller 208, the memory 210 and/or the encryption/decryption component 212. Accordingly, when coupled to the printed circuit board 102, the bottom surface of the dissipator sheet 602 is closely proximate to and absorbs heat from one or more of the heat generating components of the printed circuit board 102. The sheet 602 then distributes the absorbed heat throughout the greater area of the dissipator sheet 602. As a result, the dissipator sheet provides the advantage of reducing the quantity of heat transmitted to any one portion of the top mesh 104*a* thereby reducing the risk of heat damage to the top mesh 104*a*.

In operation, the mesh controller 208 sends and monitors periodic or continuous electrical signals transmitted through electrical paths (described above) formed by the traces 304 of the top and bottom meshes 104*a*, 104*b* via the traces within the circuit board 102, the circuit board contact pads 204 and the top and bottom mesh contact pads 306. In particular, as described above, the mesh contact pads 306 of the top and bottom meshes 104*a*, 104*b* are electrically coupled with the contact pads 204 of the top and bottom of the printed circuit board 102. Accordingly, taken together with the internal traces of the substrate 202 and the mesh controller 208, the traces 304 of the top and bottom meshes 104*a*, 104*b* form a plurality electrical paths. Each of these electrical paths serially electrically couple the mesh controller 208 (e.g. via board 102 traces coupled thereto) with a plurality of the mesh contact pads 306 (in one or both of the top and bottom meshes 104*a*, 104*b*), one or more traces 304 (in one or both of the top and bottom meshes 104*a*, 104*b*), a plurality of the board contact pads 204 (in on one or both of the top side and the bottom side of the board 102) and then back to the mesh controller 208 (e.g. forming an electrical loop). Indeed, these serial paths/connections provides the advantage of guarding against easy removal/lifting of the covers 106*a*, 106*b* as lifting breaks the electrical connection of one or more of the paths. In some embodiments the controller 208 sends five separate signals through five different loops formed by the traces 304. Alternatively, more or less signals are able to be used.

As a result, the mesh controller 208 transmits electrical signals through the electrical paths through one or both of the meshes 104*a*, 104*b* and receive the signals back as they complete their electrical loop. If the mesh controller 208 determines that there has been an attempted intrusion (e.g. based on a deviation of the received signals from their normal parameters, for example, voltage falling outside a predefined range) the controller 208 is able to send a signal to the encryption/decryption component 212 and/or other components (e.g. the CPU 206) to shut down, secure, delete or otherwise protect the data (e.g. encryption keys, key generation data) within the encryption/decryption component 212 and/or other components. Furthermore, because the electrical paths used by the mesh controller 208 span multiple contact pads 306 on different meshes 104*a*, 104*b* and/or different parts of the meshes 104*a*, 104*b* (e.g. different locations along the perimeter of the meshes) as well as multiple contact pads 204 on multiple sides of the circuit board 102, an attacker is forced to follow and serially bypass each step of each of these long circuitous electrical paths in order to try an bypass the security provided by the meshes 104*a*, 104*b*. Additionally, because the disconnection of any part of the paths will be detected by the mesh controller 208 (resulting in the securing of the security data). Thus, an attacker is unable to lift either of the meshes 104*a*, 104*b* until all of the serial paths have been bypassed making the intrusion attempt impractical.

Figure 7:
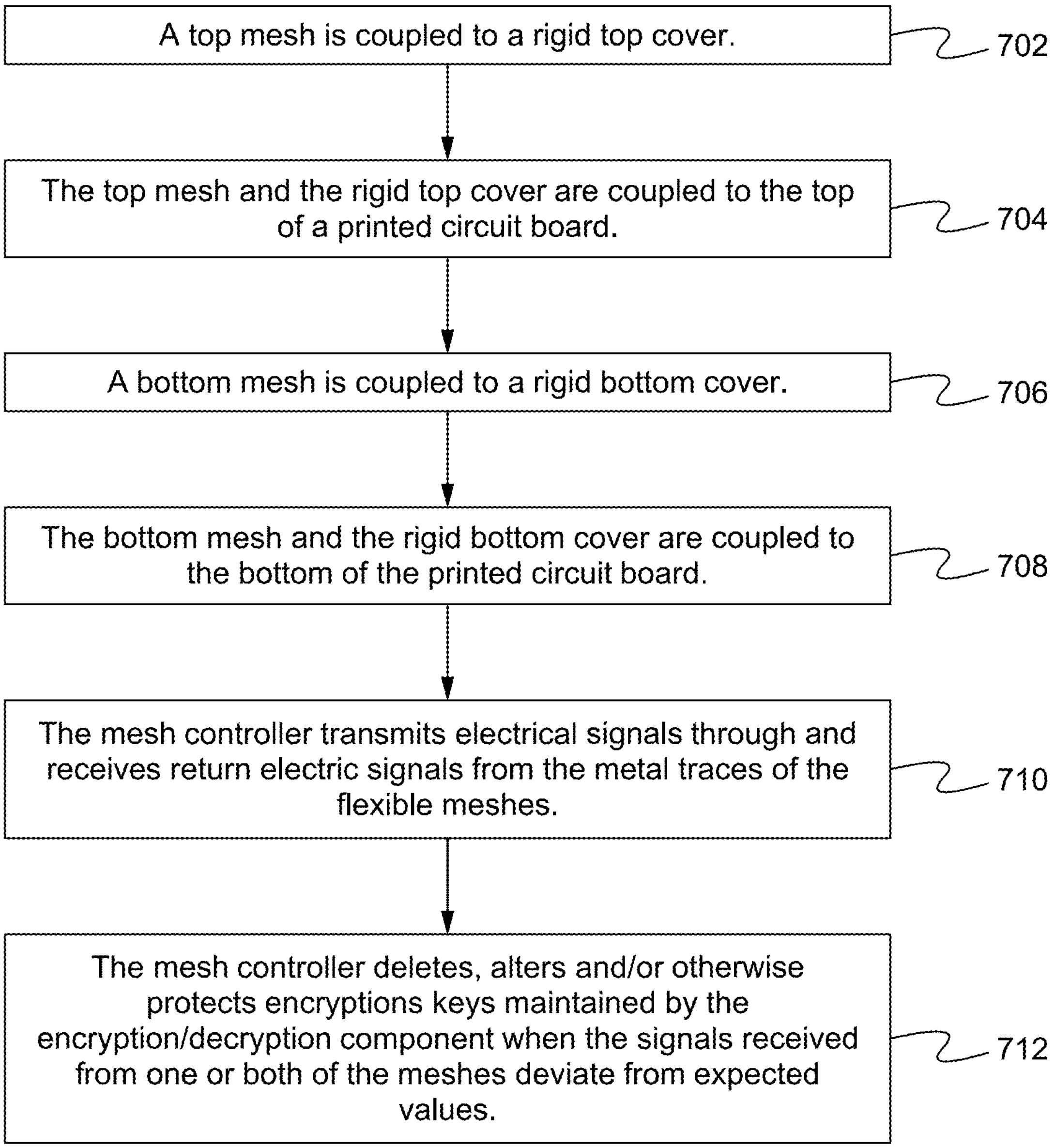
FIG. 7 illustrates a method of implementing payment card industry compliant hardware security module system according to some embodiments.

FIG. 7 illustrates a method of implementing payment card industry compliant hardware security module system 100 according to some embodiments. As shown in FIG. 7, a top mesh 104*a* is coupled to a rigid top cover 106*a* at the step 702. The rigid top cover 106*a* is able to be a heat sink cover having one or more cooling fins. The top mesh 104*a* is able to be coupled to the rigid top cover 106*a* such that it at least partially fills a cavity within the top cover 106*a* and its perimeter (including mesh contact pads 306) aligns with a perimeter of the bottom of the top cover 106*a*. The top mesh 104*a* and the rigid top cover 106*a* are coupled to the top of a printed circuit board 102 covering a encryption/decryption component 212 and/or mesh controller 208 of the printed circuit board 102 at the step 704. The bottom perimeter of the top cover 106*a* is able to press the perimeter of the top mesh 104*a* against a perimeter of contact pads 204 on the top side of the board 102. The top mesh 104*a* is able to be coupled to the printed circuit board 102 such that one or more mesh contact pads 306 are electrically coupled with one or more board contact pads 204 on the top side of the board 102 (e.g. via electrically conductive adhesive). The rigid top cover 106*a* is able to be coupled to the board 102 via one or more fasteners (e.g. screws) coupled through fastener holes and/or fastener receiving portions within the cover 106*a* and/or the board 102.

A bottom mesh 104*b* is coupled to a rigid bottom cover 106*b* at the step 706. The bottom mesh 104*b* is able to be coupled to the rigid bottom cover 106*b* such that it at least partially fills a cavity within the bottom cover 106*b* and its perimeter (including mesh contact pads 306) aligns with a perimeter of the bottom of the bottom cover 106*b*. The bottom mesh 104*b* and the rigid bottom cover 106*b* are coupled to the bottom of the printed circuit board 102 covering the portion of the printed circuit board 102 under the encryption/decryption component 212 and/or mesh controller 208 (or the encryption/decryption component 212 and/or mesh controller 208 directed to the extent they are accessible from the bottom of the printed circuit board 102) at the step 708. The bottom perimeter of the bottom cover 106*b* is able to press the perimeter of the bottom mesh 104*b* against a perimeter of contact pads 204 on the bottom side of the board 102. The bottom mesh 104*b* is able to be coupled to the printed circuit board 102 such that one or more mesh contact pads 306 are electrically coupled with one or more board contact pads 204 on the bottom side of the board 102 (e.g. via electrically conductive adhesive). The rigid bottom cover 106*b* is able to be coupled to the board 102 via one or more fasteners (e.g. screws) coupled through fastener holes and/or fastener receiving portions within the cover 106*b* and/or the board 102. In some embodiments, the top and bottom covers 106*a*, 106*b* are coupled to the board 102 using the same/shared fasteners.

The mesh controller 208 transmits electrical signals through and receives return electric signals from the metal traces 304 of the flexible meshes 104*a*, 104*b* via the board contact pads 204 and the mesh contact pads 306 at the step 710. Each of the electrical signals transmitted from the mesh controller 208 are able to travel through both of the flexible meshes 104*a*, 104*b* before returning to the mesh controller 208. The mesh controller 208 deletes, alters and/or otherwise protects encryptions keys (and/or other encryption data) maintained by the encryption/decryption component 212 when the signals received from one or both of the meshes 104*a*, 104*b* deviate from expected values at the step 712. As a result, the method provides the advantage of providing protection for the encryption/decryption component 212 that requires an attacker to disable/bypass a plurality of contact pad 306/204 points located all around the perimeter of the meshes 104*a*, 104*b* in series in order to penetrate the meshes/circuit without the controller 208 securing the encryption/decryption component 212 data.

In some embodiments, the method further comprises positioning a plurality of compressing bodies 414, 514 within channels 410, 510 of the covers 106*a*, 106*b* such that the elastic bumps of the bodies 414, 514 protrude out of the channels 410, 510 and provide additional compression between the mesh contact pads 306 and the board contact pads 204 when the covers 106*a*, 106*b* are coupled to the board 102. Thus, the method provides the advantage of facilitating a secure electrical connection between the mesh pads 306 and the board pads 204 (and/or any conductive adhesive) by applying additional compression in those locations with the compressing bodies 414, 514. In some embodiments, the method further comprises coupling a rigid metal heat dissipater plate 108 to the top side of the printed circuit board 102 between the heat producing components of the circuit board 102 (e.g. central processing unit 206, the encryption/decryption component 212 and the mesh controller 208) and the top mesh 104*a* in order to distribute heat produced by the heat producing components throughout the plate 108. Thus, the method provides the advantage of ensuring that the heat of the printed circuit board 102 is spread out through the plate 108 and then evenly transferred to the mesh 104*a*, not unevenly transferred to a small portion of the mesh 104*a* risking overheating/damage to that portion of the mesh 104*a*.

The hardware security module system, method and device described herein provides numerous advantages. Specifically, the system, method and device provide the advantage of instead of having a single mesh contact pad for each trace at a single location (thereby creating a single centralized attack point), using multiple trace contact points distributed around the mesh and circuit board for each trace, requiring a series of bypasses distributed around the mesh just to disable a single trace of the mesh. Further, the system, method and device provides the advantage of facilitating a secure electrical connection between the mesh pads and the board pads (and/or any conductive adhesive) by applying additional compression in those locations with the compressing bodies. Additionally, the system, method and device provides the advantage of ensuring that the heat of the printed circuit board is spread out through the plate and then evenly transferred to the mesh, not unevenly transferred to a small portion of the mesh risking overheating/damage to that portion of the mesh.

While the system, method and device has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details. In particular, it should be noted that although not described in detail for the sake of brevity, the components of the printed circuit board 102 are able to include one or more of a network interface, a memory, a processor, I/O device(s), a bus and a storage device. The memory is able to be any conventional computer memory known in the art. The storage device is able to include a hard drive, RAM, SRAM, CDROM, CDRW, DVD, DVDRW, flash memory card or any other storage device. An example of a network interface includes a network card connected to an Ethernet or other type of LAN. The I/O device(s) are able to include one or more of the following: keyboard, mouse, monitor, display, printer, modem, touchscreen, button interface and other devices. The operating system(s), graphical user interface(s), application(s), module(s) and/or other software used to operate the printed circuit board 102 are likely to be stored in the memory and/or storage device and processed as applications are typically processed via the processor.

We claim:

1. A hardware security module system, the system comprising:

a printed circuit board including a top side, a bottom side opposite the top side a central processing unit (CPU) positioned on the top side and a plurality of board contact pads; and a flexible mesh circuit including a web of a plurality of metal traces, wherein the flexible mesh is electrically coupled with a set of the board contact pads located on the bottom side of the printed circuit board.

2. The system of claim 1, wherein flexible mesh circuit covers a portion of the bottom side of the printed circuit board that is opposite a location of an encryption/decryption component on the top side of the printed circuit board.

3. The system of claim 1, wherein a mesh controller transmits electrical signals through and receives return electric signals from the metal traces of the flexible mesh circuit via the board contact pads.

4. The system of claim 3, wherein each of the electrical signals transmitted from the mesh controller travel through both the first flexible mesh circuit and the second flexible mesh circuit before returning to the mesh controller.

5. The system of claim 4, wherein the mesh controller deletes encryption keys maintained by an encryption/decryption component when signals received from one or both of the first and second flexible mesh circuits deviate from expected values.

6. The system of claim 1, wherein the board contact pads of the set of the board contact pads are positioned around an encryption/decryption component on the top side of the printed circuit board.

7. The system of claim 1, further comprising a rigid heat sink cover having a first side including a plurality of heat dissipating fins and a second side having a central recess, wherein the second side couples to another flexible mesh and the top side of the printed circuit board such that the another flexible mesh is sandwiched in between the second side of the rigid heat sink cover and the top side of the printed circuit board.

8. The system of claim 7, further comprising a rigid bottom cover having a first face including a central cavity for receiving the flexible mesh circuit, wherein the first face couples to the flexible mesh and the bottom side of the printed circuit board such that the flexible mesh is sandwiched in between the first face of the rigid bottom cover and the bottom side of the printed circuit board.

9. The system of claim 8, wherein the second side of the rigid heat sink cover has a plurality of channels positioned along a perimeter of the rigid heat sink, further comprising a plurality of compressing bodies each having a base and one or more elastic bumps protruding from the base, wherein each of the bases is positioned within one of the plurality of channels such that the elastic bumps of that base protrude out of the one of the plurality of channels.

10. The system of claim 9, wherein, when the another flexible mesh is sandwiched in between the second side of the rigid heat sink cover and the top side of the printed circuit board, each of the bumps is compressed against a different one of mesh contact pads thereby pushing the different one of the mesh contact pads against one of the board contact pads with which the different one of the mesh contact pads is aligned.

11. The system of claim 1, further comprising a rigid metal heat dissipator plate coupled to the top side of the printed circuit board between the central processing unit and the first flexible mesh in order to distribute heat produced by the central processing unit throughout the plate.

12. The system of claim 11, wherein a perimeter of the rigid metal heat dissipator plate is adjacent to a perimeter of the another flexible mesh where the another flexible mesh couples to the printed circuit board.

13. The system of claim 1, wherein the printed circuit board further comprises a microcontroller unit (MCU) and both a mesh controller and an encryption/decryption component are a part of the MCU.

14. A method of implementing a hardware security module system, the method comprising:

providing a printed circuit board including a top side, a bottom side opposite the top side, a central processing unit (CPU) positioned on the top side and a plurality of board contact pads; and electrically coupling a flexible mesh circuit with a set of the board contact pads located on the bottom side of the printed circuit board, the first flexible mesh circuit including a web of a plurality of metal traces.

15. The method of claim 14, wherein the flexible mesh circuit covers a portion of the bottom side of the printed circuit board that is opposite a location of an encryption/decryption component on the top side of the printed circuit board.

16. The method of claim 14, further comprising, with a mesh controller, transmitting electrical signals through and receiving return electric signals from the metal traces of the flexible mesh circuit via the board contact pads.

17. The method of claim 16, wherein each of the electrical signals transmitted from the mesh controller travel through the flexible mesh circuit before returning to the mesh controller.

18. The method of claim 17, further comprising deleting encryption keys maintained by an encryption/decryption component with the mesh controller when signals received from the flexible mesh circuit deviate from expected values.

19. The method of claim 14, wherein the board contact pads of the set of the board contact pads are positioned around an encryption/decryption component on the top side of the printed circuit board.

20. The method of claim 14, further comprising coupling a second side of a rigid heat sink cover to both of another flexible mesh and the top side of the printed circuit board such that the another flexible mesh is sandwiched in between the second side of the rigid heat sink cover and the top side of the printed circuit board, the rigid heat sink cover having a first side including a plurality of heat dissipating fins and the second side having a central recess.

21. The method of claim 20, further comprising coupling a first face of a rigid bottom cover to both of the flexible mesh and the bottom side of the printed circuit board such that the flexible mesh is sandwiched in between the first face of the rigid bottom cover and the bottom side of the printed circuit board, the rigid bottom cover having the first face including a central cavity for receiving the flexible mesh.

22. The method of claim 21, wherein the second side of the rigid heat sink cover has a plurality of channels positioned along a perimeter of the rigid heat sink, further comprising positioning a plurality of compressing bodies, each having a base and one or more elastic bumps protruding from the base, within one of the plurality of channels such that the elastic bumps of that base protrude out of the one of the plurality of channels.

23. The method of claim 22, wherein, when the another flexible mesh is sandwiched in between the second side of the rigid heat sink cover and the top side of the printed circuit board, each of the bumps is compressed against a different one of mesh contact pads thereby pushing the different one of the mesh contact pads against one of the board contact pads with which the different one of the mesh contact pads is aligned.

24. The method of claim 14, further comprising coupling a rigid metal heat dissipator plate to the top side of the printed circuit board between the central processing unit and the first flexible mesh in order to distribute heat produced by the central processing unit throughout the plate.

25. The method of claim 24, wherein a perimeter of the rigid metal heat dissipator plate is adjacent to a perimeter of the another flexible mesh where the another flexible mesh couples to the printed circuit board.

26. The method of claim 14, wherein the printed circuit board further comprises a microcontroller unit (MCU) and both a mesh controller and an encryption/decryption component are a part of the MCU.

27. A hardware security module adapter, the adapter comprising:

a substrate including a top side, a bottom side opposite the top side, a central processing unit (CPU) and a plurality of substrate contact pads;

a flexible mesh circuit including a web of a plurality of first metal traces; and a heat sink cover having a first side including a plurality of heat dissipating fins and a second side, wherein the second side couples to the flexible mesh and the top side of the substrate such that the flexible mesh is sandwiched in between the second side of the rigid heat sink cover and the top side of the substrate.

28. The adapter of claim 27, wherein the flexible mesh circuit covers a location of an encryption/decryption component on the top side of the substrate.

29. The adapter of claim 27, wherein a mesh controller transmits electrical signals through and receives return electric signals from the first metal traces of the flexible mesh circuit via the substrate contact pads.

30. The adapter of claim 29, wherein each of the electrical signals transmitted from the mesh controller travel through the flexible mesh circuit, the substrate contact pads and traces within the substrate before returning to the mesh controller.

31. The adapter of claim 30, wherein the mesh controller deletes data stored in an encryption/decryption component required to generate encryption keys when signals received from the flexible mesh circuit deviate from expected values.

32. The adapter of claim 27, wherein the substrate contact pads of the first set of the substrate contact pads are positioned around an encryption/decryption component on the top side of the substrate.

33. The adapter of claim 27, wherein the second side of the rigid heat sink cover has a plurality of channels positioned along a perimeter of the rigid heat sink, further comprising a plurality of compressing bodies each having a base and one or more elastic bumps protruding from the base, wherein each of the bases is positioned within one of the plurality of channels such that the elastic bumps of that base protrude out of the one of the plurality of channels.

34. The adapter of claim 33, wherein, when the flexible mesh is sandwiched in between the second side of the rigid heat sink cover and the top side of the substrate, each of the bumps is compressed against a different one of first mesh contact pads thereby pushing the different one of the first mesh contact pads against one of the first set of substrate contact pads with which the different one of the first mesh contact pads is aligned.

35. The adapter of claim 27, further comprising a rigid metal heat dissipator plate coupled to the top side of the substrate between the central processing unit and the flexible mesh in order to distribute heat produced by the central processing unit throughout the plate.

36. The adapter of claim 35, wherein a perimeter of the rigid metal heat dissipator plate is adjacent to a perimeter of the flexible mesh where the flexible mesh couples to the substrate.

37. The adapter of claim 27, wherein the substrate further comprises a microcontroller unit (MCU) and both a mesh controller and an encryption/decryption component are a part of the MCU.

38. A security module system, the system comprising:

a printed circuit board including a top side, a bottom side opposite the top side, means for processing data and means for electrically coupling; and the means for securing including first means for forming a conductive web electrically coupled with a first portion of the means for electrically coupling positioned on the bottom side of the printed circuit board.

* * * * *